United States Patent
Hoshino et al.

(10) Patent No.: US 8,292,749 B2
(45) Date of Patent: Oct. 23, 2012

(54) FIXED TYPE CONSTANT VELOCITY UNIVERSAL JOINT

(75) Inventors: Manabu Hoshino, Iwata (JP); Teruaki Fujio, Iwata (JP); Tohru Nakagawa, Iwata (JP); Wasaburo Suganuma, Iwata (JP)

(73) Assignee: NTN Corporation, Osaka (JP)

( * ) Notice: Subject to any disclaimer, the term of this patent is extended or adjusted under 35 U.S.C. 154(b) by 283 days.

(21) Appl. No.: 12/676,169

(22) PCT Filed: Sep. 11, 2008

(86) PCT No.: PCT/JP2008/066429
§ 371 (c)(1),
(2), (4) Date: Mar. 3, 2010

(87) PCT Pub. No.: WO2009/041280
PCT Pub. Date: Apr. 2, 2009

(65) Prior Publication Data
US 2010/0173715 A1    Jul. 8, 2010

(30) Foreign Application Priority Data

Sep. 26, 2007 (JP) ................................. 2007-249405
Feb. 27, 2008 (JP) ................................. 2008-046101

(51) Int. Cl.
*F16D 3/2245* (2011.01)
(52) U.S. Cl. ........................................ 464/145; 464/906
(58) Field of Classification Search .................. 464/140, 464/143, 144, 145, 146, 906
See application file for complete search history.

(56) References Cited

U.S. PATENT DOCUMENTS

| 2,046,584 | A |   | 7/1936 | Rzeppa |
|---|---|---|---|---|
| 4,020,650 | A | * | 5/1977 | Krude ........................... 464/146 |
| 4,589,857 | A |   | 5/1986 | Okoshi |
| 6,120,382 | A |   | 9/2000 | Sone et al. |
| 6,431,988 | B1 | * | 8/2002 | Tone ............................. 464/145 |
| 6,796,906 | B2 | * | 9/2004 | Cermak ........................ 464/145 |
| 2001/0021671 | A1 |   | 9/2001 | Ouchi et al. |
| 2001/0024976 | A1 |   | 9/2001 | Ouchi et al. |

(Continued)

FOREIGN PATENT DOCUMENTS

DE    102007048327    4/2009
(Continued)

OTHER PUBLICATIONS

International Preliminary Report on Patentability and Written Opinion of the International Searching Authority mailed Apr. 15, 2010 in International (PCT) Application No. PCT/JP2008/066429.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A fixed type constant velocity universal joint is capable of reducing the size and weight of a cage while keeping the strength of the cage, and is also capable of improving the high angle strength and the durability. An offset angle $\theta_{CAGE}$ of the cage, which is defined by lines that connect a center curvature of an inner spherical surface and a center curvature of an outer spherical surface of the cage and centers of torque transmission balls, and a line that connects the centers of the torque transmission balls and a joint center in a state where a joint operating angle is 0°, is set in a range of $2.7° \leq \theta_{CAGE} < 5.7°$.

22 Claims, 21 Drawing Sheets

U.S. PATENT DOCUMENTS

| | | |
|---|---|---|
| 2002/0032064 A1 | 3/2002 | Sone et al. |
| 2005/0261066 A1 | 11/2005 | Nakagawa et al. |
| 2005/0272510 A1 | 12/2005 | Nakagawa et al. |
| 2007/0161428 A1 | 7/2007 | Nakao et al. |

FOREIGN PATENT DOCUMENTS

| | | |
|---|---|---|
| EP | 0 950 824 | 10/1999 |
| EP | 1 707 835 | 10/2006 |
| GB | 441718 | 1/1936 |
| GB | 2 155 149 | 9/1985 |
| JP | 60-179521 | 9/1985 |
| JP | 3859264 | 12/1997 |
| JP | 11-303882 | 11/1999 |
| JP | 2000-230570 | 8/2000 |
| JP | 2005-337304 | 12/2005 |
| JP | 2005-337306 | 12/2005 |
| JP | 2006-194268 | 7/2006 |
| JP | 2007-64264 | 3/2007 |
| WO | 2005/068863 | 7/2005 |

OTHER PUBLICATIONS

Supplementary European Search Report issued Oct. 7, 2011 in corresponding International Application No. 08833795.1.

International Search Report issued Dec. 16, 2008 in International (PCT) Application No. PCT/JP2008/066429.

* cited by examiner

FIXED TYPE CONSTANT VELOCITY UNIVERSAL JOINT

TECHNICAL FIELD

The present invention relates to a fixed type constant velocity universal joint that is used in a power transmission system of automobiles or various industrial machineries, and transmits a rotation torque while permitting an operating angular displacement between two shafts of a driving side and a driven side.

BACKGROUND ART

In automobiles and various vehicles also categorized to the automobiles, a constant velocity universal joint capable of transmitting a rotation power at a constant velocity even if an angular displacement or an axial displacement occurs between those two shafts is arranged in a power transmission channel through which a driving force from an engine is transmitted to wheels. The constant velocity universal joints include a fixed type constant velocity universal joint that does not conduct plunging motion (axial displacement), and a slide type constant velocity universal joint that conducts the plunging motion. The fixed type constant velocity universal joints that have been widely known are a bar field type constant velocity universal joint (BJ) and an undercut free type constant velocity universal joint (UJ).

For example, as shown in FIGS. 23 and 24, the fixed type constant velocity universal joint of the UJ type includes an outer ring 3 that functions as an outer joint member in which a plurality of track grooves 2 are formed on an inner spherical surface 1 along the axial direction at regular intervals in the circumferential direction, an inner ring 6 that functions as an inner joint member in which a plurality of track grooves 5 that are paired with the track grooves 2 of the outer ring 3 are formed on an outer spherical surface 4 along the axial direction at regular intervals in the circumferential direction, a plurality of balls 7 that are interposed between the track grooves 2 of the outer ring 3 and the track grooves 5 of the inner ring 6 to transmit torque, and a cage 8 that is interposed between the inner spherical surface 1 of the outer ring 3 and the outer spherical surface of the inner ring 6 to hold the balls 7. A plurality of pockets 9 that receive the balls 7 are arranged in the cage 8 along the circumferential direction.

Also, each of the track grooves 2 of the outer ring 3 has a circular arc portion 2a at a back side, and a straight line portion 2b at an opening side. Each of the track grooves 5 of the inner ring 6 has a straight line portion 5a at a back side, and a circular arc portion 5b at an opening side. The center curvature O1 of the track grooves 5 of the inner ring 6 and the center curvature O2 of the track grooves 2 of the outer ring 3 are offset with respect to a joint center O at regular distances F in opposite directions along the axial direction, respectively.

In recent years, in order to downsize the universal joint, eight balls are disposed as shown in FIG. 24 (Patent Document 1). In this case, when it is assumed that the cage thickness at the pocket center position of the cage is tCAGE, and the pitch circle radius of the balls when the operating angle is 0° is PCRBALL, $t_{CAGE}/PCR_{BALL}$ that is the ratio of the cage thickness and the pitch circle radius is set to about 0.11 to 0.19.

Also, in the conventional UJ type constant velocity universal joint, as shown in FIG. 26, for the purposes of reducing the universal joint in size and weight, the offset angles $\theta_{TRACK}$ of the track grooves which are defined by lines that connect the center curvatures O1 and O2 of the respective track grooves 2 and 5 of the inner and outer rings 3 and 6 and the centers Q of the torque transmission balls 7, and lines that connect the centers Q of the torque transmission balls 7 and the joint center O are set in a range of $4°\leq\theta_{TRACK}\leq 6°$ (Patent Document 2).

In the conventional UJ type constant velocity universal joint disclosed in Patent Document 2, the center curvature O10 of the inner spherical surface 1 of the outer ring 3 (the center curvature of an outer spherical surface 8a of the cage 8) and the center curvature O20 of the outer spherical surface 4 of the inner ring 6 (center curvature of an inner spherical surface 8b of the cage 8) are also offset across the joint center O at regular distances in the axial direction, respectively. Then, the offset angles $\theta_{CAGE}$ of the cage 8 which are defined by lines that connect the center curvatures O10 and O20 of the inner and outer spherical surfaces 8a and 8b of the cage 8 and the center Q of the torque transmission balls 7, and the lines that connect the centers Q of the torque transmission balls 7 and the joint center O are set in a range of $0°<\theta_{CAGE}\leq 1°$. In this way, because the cage 8 is set to be very small in the offset angle $\theta_{CAGE}$, the cage 8 is formed with the substantially same thickness.

Patent Document 1: JP 3859264 B
Patent Document 2: JP 2005-337304 A

SUMMARY OF THE INVENTION

Problem to be Solved by the Invention

In recent years, for the purposes of further reducing the fixed type constant velocity universal joint in size and weight, an attempt has been made to further thin the thickness of the cage 8. In the constant velocity universal joint disclosed in Patent Document 1, when an attempt is made to further downsize the universal joint, that is, to reduce the pitch circle radius while $t_{CAGE}/PCR_{BALL}$ is kept to 0.11 to 0.19, the thickness of the cage 8 is necessarily thinned. When the thickness of the cage 8 is thus thinned, pillar portions between the pockets 9, and the side frames of the pockets 9 (window frames that face each other in the axial direction) are deteriorated in rigidity. That is, when the joint rotates at high operating angle, because a large load is exerted on an end of the cage 8 at the joint opening side, the strength of the end must be ensured. However, it is difficult to ensure the strength for the constant velocity universal joint at high operating angle.

Also, in the configuration of the joint disclosed in the above Patent Document 2, when the thickness of the cage 8 is set to be thinner, it is difficult to sufficiently ensure the strength of the end of the cage 8 at the joint opening side because the cage 8 is uniformly thinly formed. Also, deterioration of the strength of the end at the joint opening side, which is attributable to a reduction of the cage 8 in size and weight, is remarkably recognizable in the small sized fixed type constant velocity universal joint which is particularly applied to a compact car or a light car.

Therefore, the present invention has been made in view of the above circumstances, and an object of the present invention is to provide a fixed type constant velocity universal joint which is capable of reducing the size and weight while keeping the strength of the cage, and is also capable of improving the high angle strength and the durability.

Means for Solving the Problems

A first fixed type constant velocity universal joint according to the present invention includes: an outer joint member in which six track grooves that extend in an axial direction are formed on an inner spherical surface; an inner joint member in which six track grooves that extend in an axial direction are formed on an outer spherical surface; six torque transmission balls which are arranged one by one in ball tracks that are formed by pairs of the track grooves of the outer joint member and the track grooves of the inner joint member; and a cage that is interposed between the inner spherical surface of the outer joint member and the outer spherical surface of the inner joint member to hold the torque transmission balls, in which a center curvature of the outer spherical surface of the cage is offset to a joint opening side with respect to a joint center, and a center curvature of the inner spherical surface of the cage is offset to a joint back side with respect to the joint center, at regular distances in opposite sides to each other in the axial direction, respectively, and in which an offset angle $\theta_{CAGE}$ of the cage, which is defined by lines that connect the center curvature of the inner spherical surface and the center curvature of the outer spherical surface of the cage and centers of the torque transmission balls, and a line that connects the centers of the torque transmission balls and the joint center in a state where a joint operating angle is 0°, is set in a range of $2.7° \leq \theta_{CAGE} \leq 5.7°$.

According to the first fixed type constant velocity universal joint of the present invention, the offset angle $\theta_{CAGE}$ of the cage is set to be larger than the offset angle ($0° < \theta_{CAGE} < 1°$) of the conventional cage, thereby forming the thickness of the end of the cage at the joint opening side to be larger than those of other portions. When the offset angle of the cage is lower than 2.7°, the end of the cage at the joint opening side is thinned, thereby making it impossible to ensure the sufficient strength thereof. Also, when the offset angle of the cage exceeds 5.7°, the thickness of the end of the cage at the joint back side is extremely thinned. Heat treatment is generally conducted in a process of manufacturing the cage. However, when the thickness of the cage is extremely thinned, an uncured layer due to the heat treatment is reduced in the portions having the thin thickness thereof, and the toughness is deteriorated, and the sufficient strength cannot be ensured. Also, when the thickness difference between the end of the cage at the joint opening side and the end at the joint back side is large, there is a risk that the workability is deteriorated.

A second fixed type constant velocity universal joint according to the present invention includes: an outer joint member in which six track grooves that extend in an axial direction are formed on an inner spherical surface; an inner joint member in which six track grooves that extend in an axial direction are formed on an outer spherical surface; six torque transmission balls which are arranged one by one in ball tracks that are formed by pairs of the track grooves of the outer joint member and the track grooves of the inner joint member; and a cage that is interposed between the inner spherical surface of the outer joint member and the outer spherical surface of the inner joint member to hold the torque transmission balls, in which a cage thickness at a pocket center position of the cage is $t_{CAGE}$, a pitch circle radius of the balls when an operating angle is 0° is $PCR_{BALL}$, and $t_{CAGE}/PCR_{BALL}$ which is a ratio of the cage thickness and the pitch circle radius is equal to or higher than 0.20 and equal to or lower than 0.23.

According to the second fixed type constant velocity universal joint of the present invention, since the number of balls is six, the relatively large balls can be used, and further, the pillar widths of the cage between the pockets can be thickened. Incidentally, when $t_{CAGE}/PCR_{BALL}$ is lower than 0.20, the outer diameter becomes larger with the results that the downsizing is difficult, the thickness of the cage is thinned, and it is difficult to ensure the required joint strength at large angle. On the other hand, when $t_{CAGE}/PCR_{BALL}$ exceeds 0.23, the thickness of the inner ring (inner joint member) in the inner diameter serration section (shaft fitting section) is thinned, with results that it is difficult to ensure the required joint strength at large angle (at high operating angle), and the spherical surfaces of the inner joint member and the outer joint member become smaller, to thereby deteriorate the allowable torque level. As a result, the balls readily run on the edge portions of the track grooves of the inner joint member and the outer joint member, and there is a risk that the durability is remarkably deteriorated. For that reason, $0.20 \leq t_{CAGE}/PCR_{BALL} \leq 0.23$ is satisfied, thereby making it possible to improve a reduction in size and the strength of the cage, and also to prevent the balls from running on the edge portions of the track grooves.

In the second fixed type constant velocity universal joint, it is also preferable that an offset angle $\theta_{CAGE}$ of the cage, which is defined by lines that connect the center curvature of the inner spherical surface and the center curvature of the outer spherical surface of the cage and centers of the torque transmission balls, and a line that connects the centers of the torque transmission balls and the joint center, be set in a range of $2.7° \leq \theta_{CAGE} \leq 5.7°$.

Also, in the respective fixed type constant velocity universal joints, the center curvatures of the track grooves of the outer joint member are offset to the joint opening side with respect to the joint center, and the center curvatures of the track grooves of the inner joint member are offset to the joint back side with respect to the joint center, at regular distances in the opposite sides to each other in the axial direction, respectively, and the offset angles $\theta_{TRACK}$ of the track grooves which are defined by lines that connect the center curvatures of the respective track grooves of the inner and outer joint members and the centers of the torque transmission balls, and the lines that connect the centers of the torque transmission balls and the joint center in a state where the joint operating angle is 0° may be set to be substantially identical with the offset angle $\theta_{CAGE}$ of the cage. That is, it is preferable that the offset amount of the cage be so large as to be substantially identical with the offset amount of the track grooves. With the above arrangement, the track groove depth at the joint back side can be prevented from being made shallow, and the thickness (radial thickness) of the cage at the opening side can be increased.

A ratio r1 ($=PCD_{BALL}/D_{BALL}$) of the pitch circle diameter ($PCD_{BALL}$) of the torque transmission balls and the diameter ($D_{BALL}$) of the torque transmission balls can be set in a range of $3.0 \leq r1 \leq 3.3$. As a result, the strength and durability for the constant velocity universal joint can be ensured.

When the ratio of the pitch circle diameter and the diameter of the balls is lower than 3.0, in the case where the diameter of the balls is larger, the thickness of the inner joint member is too thin, whereby the strength is concerned. In the case where the pitch circle diameter of the balls is smaller, the surface pressures between the inner joint member (inner ring), the outer joint member (outer ring) and the balls become larger, whereby the durability is concerned. In contrast, when the ratio of the pitch circle diameter and the diameter of the balls exceeds 3.3, in the case where the diameter of the balls is smaller, the load capacity of the balls becomes smaller, whereby the durability is concerned. In the case where the diameter of the balls is larger, the outer joint member outer diameter becomes larger, whereby the downsizing cannot be achieved.

A ratio r2 ($=D_{OUTER}/D_{BALL}$) of the outer diameter ($D_{OUTER}$) of the outer joint member and the diameter ($D_{BALL}$)

of the torque transmission balls can be set in a range of $4.6 \leq r2 \leq 4.8$. When the ratio of the outer diameter of the outer joint member and the diameter of the balls is lower than 4.6, in the case where the diameter of the balls is larger, the thickness of the outer joint member is too thin, whereby the strength is concerned. In the case where the outer diameter of the outer joint member is smaller, the surface pressures between the inner joint member, the outer joint member and the balls become larger, whereby the durability is concerned. In contrast, when the ratio of the outer diameter of the outer joint member and the diameter of the balls exceeds 4.8, in the case where the diameter of the balls is smaller, the load capacity of the balls becomes smaller, whereby the durability is concerned. In the case where the outer diameter of the outer joint member is larger, the downsizing cannot be achieved.

Further, the respective track grooves of the inner joint member and the outer joint member can be arranged at irregular pitches in a circumferential direction, and a circumferential length of an opening side end of the inner spherical surface which is disposed within a minimum pitch among a plurality of inner spherical surfaces that are arranged between the adjacent track grooves of the outer joint member can be set to be smaller than a width of a pocket of the cage.

Incidentally, when the constant velocity joint is assembled, the cage is incorporated into the outer joint member. In a process of incorporating the cage into the outer joint member, the pockets of the cage generally face the inner spherical surface that is arranged within the minimum pitch of the outer joint member, and are then incorporated thereinto. With the configuration described above, a circumferential length of the opening side end of the inner spherical surface which is arranged within the minimum pitch is set to be smaller than the width of the facing pocket of the cage. For that reason, the cage can be readily incorporated into the outer joint member without the inner spherical surface interfering with the outer circumferential surface of the cage.

Further, a phase of two pitches which are symmetrically positioned with respect to the joint center among the pitches between the respective adjacent track grooves of the inner joint member and the outer joint member can be set to be smaller than 60°, a phase of the remaining four pitches can be set to be larger than 60°, and the circumferential length of the opening side end of the inner spherical surface of the outer joint member which is disposed within the pitch of the phase which is smaller than 60° can be set to be smaller than the width of the pocket of the cage.

In the above case, when the cage is incorporated into the outer joint member, the pockets of the cage are allowed to face the inner spherical surface of the outer joint member which is arranged within the pitch of a phase smaller than 60° to incorporate the cage into the outer joint member. In this situation, since the circumferential length of the opening side end of the inner spherical surface which is arranged within the pitch smaller than 60° is set to be smaller than the width of the facing pocket of the cage, the cage can be readily incorporated into the outer joint member without the inner spherical surface interfering with the outer circumferential surface of the cage. Also, since the inner spherical surface (opening side end) of the circumferential length which is smaller than the width of the pocket is arranged symmetrically with respect to the joint center, the incorporation is still facilitated.

A pillar portion of the cage, which is disposed within the pitch of the phase which is smaller than 60°, can be removed, a long pocket that can hold the two torque transmission balls can be formed in the cage, and a circumferential length of the long pocket can be set to be larger than a width of the inner joint member.

In the above case, when the inner joint member is incorporated into the cage, one of the outer spherical surfaces which are disposed between the adjacent track grooves of the inner joint member is inserted into the long pocket of the cage, and the inner joint member is received within the cage. In this situation, since the circumferential length of the long pocket is set to be larger than the width of the inner joint member, the outer spherical surface of the inner joint member can be readily inserted into the long pocket without any interference.

Further, a part of a pillar portion of the cage, which is disposed within the pitch of the phase which is smaller than 60°, may be removed, a long pocket that can hold the two torque transmission balls may be formed in the cage, and a circumferential length of the long pocket may be set to be larger than a width of the inner joint member.

Similarly, in this case, when the inner joint member is incorporated into the cage, one of the outer spherical surfaces which are disposed between the adjacent track grooves of the inner joint member is inserted into the long pocket of the cage, and the inner joint member is received within the cage. In this situation, because the circumferential length of the long pocket is set to be larger than the width of the inner joint member, the outer spherical surface of the inner joint member can be readily inserted into the long pocket without any interference.

The pillar portion of the cage, which is disposed within the pitch of the phase which is smaller than 60°, may be removed by press working or a milling process.

Further, it is preferable that a notch portion be formed in a terminal edge of the joint back side of at least one track groove of the inner joint member. The notch portion may be formed by plastic forming.

When the inner joint member is incorporated into the cage, the track grooves of the inner joint member having a notch portion (for example, constituted by a slope portion or a step portion) cross the inlet portion of the cage. In this case, the inner joint member enables the track grooves having the slope portion or the step portion to be arranged totally closer to the inlet portion of the cage than the track grooves (having no slope portion or the like) of the conventional inner joint member. With the above configuration, it is possible to ensure a large gap between the outer spherical surface of the inner joint member which is disposed on the opposite side of a guide groove having the slope portion or the step portion, and the inlet portion of the cage.

The universal joint is of an undercut free type in which a straight portion is disposed in each of bottom surfaces of the track grooves of the inner joint member and the outer joint member, or a tapered portion is disposed in each of bottom surfaces of the track grooves of the inner joint member and the outer joint member.

At least one of the track grooves of the outer joint member and the track grooves of the inner joint member can be formed through a plastic forming process, or formed through a grinding process or a quenching steel cutting process. In this example, the quenching steel cutting is merely referred to cutting, and cutting is normally conducted in a state of a raw material, and therefore the cutting is called "quenching steel cutting" in order to clarify that the quenching steel cutting is cutting after the heat treatment (quenching) has been conducted.

Effects of the Invention

In the first fixed type constant velocity universal joint according to the present invention, it is possible to make the thickness of the end of the cage at the joint opening side larger than those of other portions. As a result, even if the cage is thinly formed for the purpose of reducing the joint in size and weight, the end of the cage at the joint opening side is capable of ensuring the strength that is capable of withstanding a load which is exerted when the joint rotates at high operating angle.

In the second fixed type constant velocity universal joint according to the present invention, since the relatively large balls can be used, the allowable torque capacity of one ball can be ensured, and the universal joint can be arranged in a small PCD, that is, the outer diameter can be downsized. Since the thickness of the pillar portions between the pockets of the cage can be also thickened, the strength at high operating angle can be ensured.

When $0.20 \leq t_{CAGE}/PCR_{BALL} \leq 0.23$ is satisfied, it is possible to improve a reduction in size and the cage strength, and further the ball can be prevented from running on the edge portion of the track grooves. That is, according to the present invention, the downsizing (reduction in size) can be achieved, and the strength of the cage can be ensured even if the reduction in size is conducted. Further, the cage damage at the time of a high angle torsion torque load can be prevented, and the high angle strength can be improved. For that reason, the joint strength durability that is equal to or higher than that of the conventional product (fixed type joint of eight balls) can be ensured by a more downsized form.

The ratio of the pitch circle diameter of the ball and the diameter of the ball is equal to or higher than 3.0 and equal to or lower than 3.3, thereby making it possible to provide the high-precision constant velocity universal joint which is capable of ensuring the strength and durability for the constant velocity universal joint. Also, the ratio of the outer diameter of the outer joint member and the diameter of the ball is equal to or higher than 4.6 and equal to or lower than 4.8, thereby making it possible to further ensure the strength and the durability. The offset angle of the cage is set to be equal to or higher than 2.7° and equal to or lower than 5.7°, thereby making it possible to make the thickness of the end of the cage at the joint opening side larger than those of other portions, and even if the cage is thinly formed for the purpose of reducing the joint in size and weight, the end of the cage at the joint opening side is capable of ensuring the strength that is capable of withstanding a load which is exerted when the joint rotates at high operating angle.

The offset amount of the cage is made substantially as large as the offset amount of the track grooves, thereby making it possible to prevent the track groove depth of the joint back side from being made shallow, and also making it possible to increase the thickness (thickness in the radial direction) of the cage at the opening side. For that reason, the ball at high angle can be prevented from running on the track edge portion, and an excessive stress is not exerted on the edge. That is, the torsion torque load capacity at high angle is prevented from being deteriorated, thereby enabling an improve (amelioration) of the high angle durability life and an improvement (amelioration) in failure strength which is caused by the plastic deformation of the track grooves of the inner joint member and the outer joint member at high angle.

When the track grooves of the inner joint member and the track grooves of the outer joint member are arranged at irregular pitches in the circumferential direction, the pockets of the cage are also arranged at irregular pitches in the circumferential direction. As a result, when the inner ring is incorporated into the cage, the pockets whose circumferential length is large at the time of assembling thereof can be used, thereby making it possible to improve the assembling property.

The circumferential length of the opening side end of the inner spherical surface which is disposed within the minimum pitch is made smaller than the width of the pockets of the cage, or the circumferential length of the opening side end of the inner spherical surface of the outer joint member which is disposed within the pitch of a phase smaller than 60° is made smaller than the width of the pockets of the cage, thereby making it possible to improve the integration property when the cage is incorporated into the outer joint member.

When the long pocket that is capable of holding the two torque transmission balls is formed in the cage, and the circumferential length of the long pocket is set to be larger than the width of the inner joint member, it is possible to improve the integration property when the inner joint member is incorporated into the cage.

Also, in forming the long pocket in the cage, a method of removing the pillar portions can be press working or a milling process, and the long pocket can be stably formed through those various plastic forming.

With the provision of the notch portion on the terminal edge of the joint back side of the track grooves of the inner joint member, when the integration is conducted, a gap defined at the inlet portion of the cage can be increased, thereby making it possible to improve the integration property.

Also, in the formation of the track grooves, there can be applied diverse machining methods such as a plastic forming process, a grinding process, or a quenching steel cutting process, which are excellent in productivity.

Figure 1:
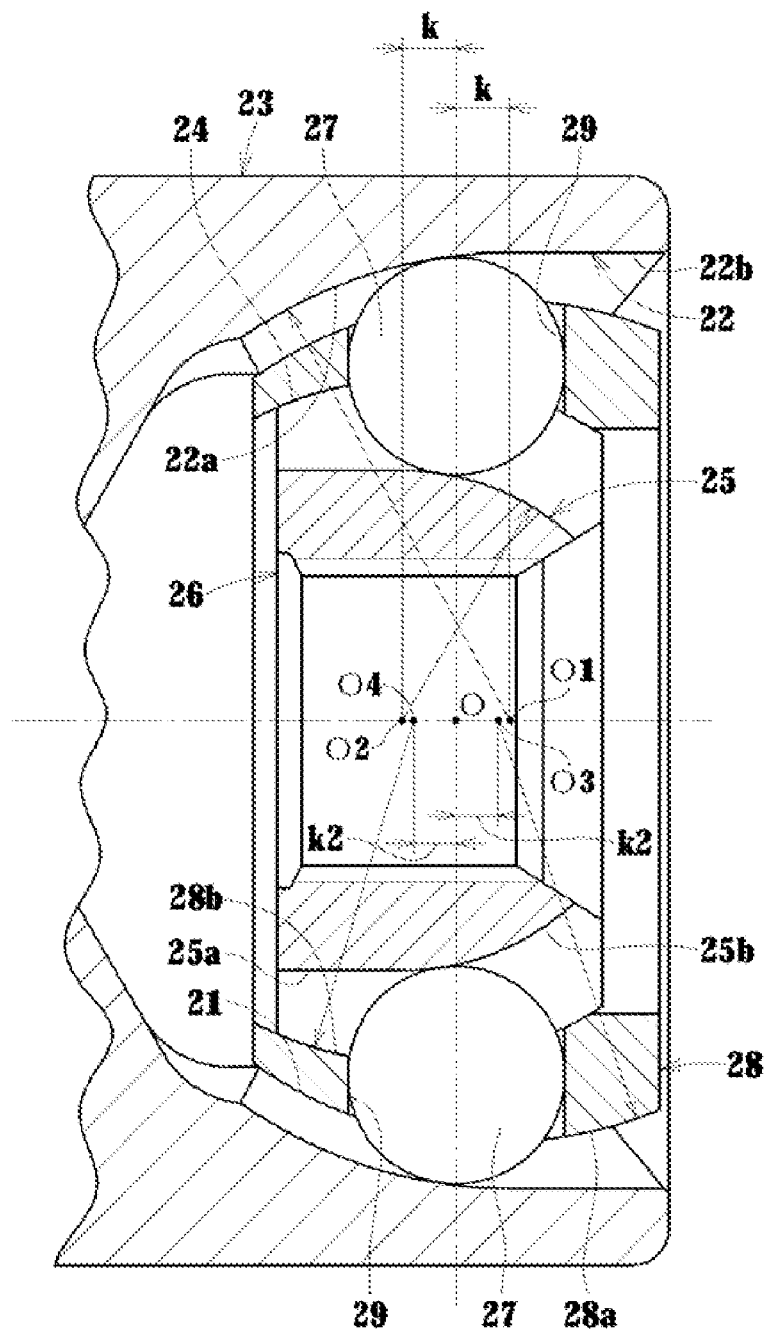
FIG. 1 A longitudinal cross-sectional view showing a fixed type constant velocity universal joint according to a first embodiment of the present invention.

DESCRIPTION OF REFERENCE NUMERALS 21 inner spherical surface
22 track groove
24 outer spherical surface
25 track groove
27 torque transmission balls
28 cage
28a outer spherical surface
28b inner spherical surface
29 pocket
30 long pocket
31 short pocket
33 pillar portion
45 notch portion

DETAILED DESCRIPTION OF THE INVENTION

Hereinafter, a description is given of the embodiments of the present invention with reference to FIGS. 1 to 22.

Figure 2:
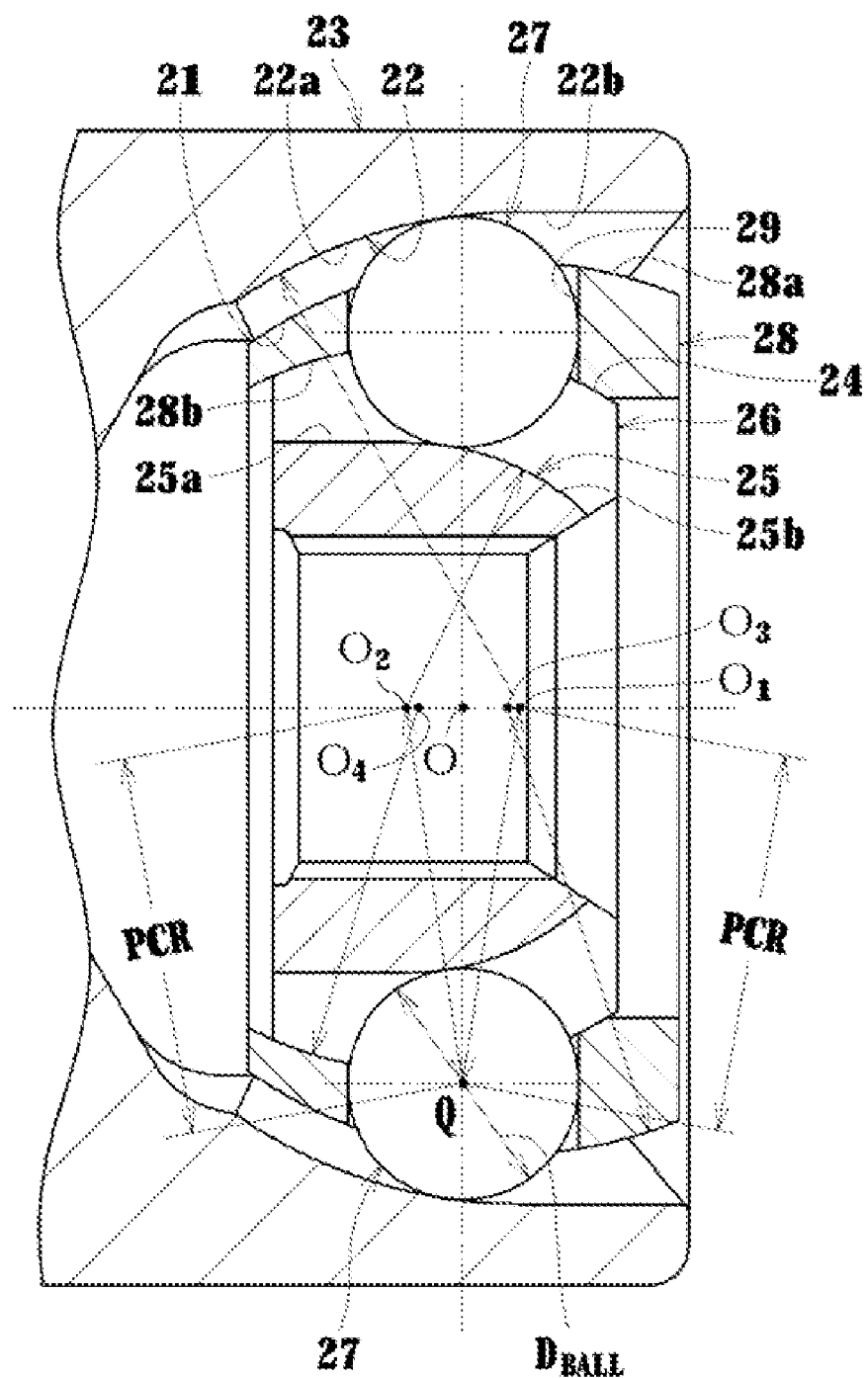
FIG. 2 A longitudinal cross-sectional view showing the fixed type constant velocity universal joint.

As shown in FIGS. 1 and 2, a fixed type constant velocity universal joint includes an outer ring 23 that functions as an outer joint member in which a plurality of (six) track grooves 22 are formed on an inner spherical surface 21 along the axial direction, an inner ring 26 that functions as an inner joint member in which a plurality of (six) track grooves 25 that are paired with the track grooves 22 of the outer ring 23 are formed on an outer spherical surface 24 along the axial direction, a plurality of (six) balls 27 that are interposed between the track grooves 22 of the outer ring 23 and the track grooves 25 of the inner ring 26 to transmit torque, and a cage 28 having pockets (pockets) 29 which are interposed between the inner spherical surface 21 of the outer ring 23 and the outer spherical surface 24 of the inner ring 26 to hold the balls 27. In this case, as shown in FIG. 2, six pockets 29 are arranged at regular pitches (60° pitches) along the circumferential direction.

Each of the track grooves 22 of the outer ring 23 includes a back side track groove 22a in which the track groove bottom is a circular arc portion, and an opening side track groove 22b in which the track groove bottom is a straight portion that is in parallel to the outer ring axis line. The back side track groove 22a has a center curvature O1 offset toward the opening side of the outer ring 23 from a joint center O in an axial direction. Also, each of the track grooves 25 of the inner ring 26 includes a back side track groove 25a in which the track groove bottom is a straight portion which is in parallel to the inner ring axis line, and an opening side track groove 25b in which the track groove bottom is a circular arc portion. A center curvature O2 of the opening side track grooves 25b is apart from the joint center O by a regular distance k toward the back side opposite to the center curvature O1 of the back side track groove 22a of the outer ring 23 in the axial direction.

The track grooves 22 of the outer ring 23 and the track grooves 25 of the inner ring 26 can be formed through plastic forming, grinding, or quenching steel cutting. Here, the quenching steel cutting is merely directed to cutting, and cutting is normally conducted in a state of a raw material, and therefore the cutting is referred to as "quenching steel cutting" in order to clarify that the cutting is conducted after the heat treatment (quenching) has been conducted. In order to conduct cutting after quenching, the heat treatment deformation of a material can be removed in the cutting process. When quenching is conducted, a tensile residual stress is liable to remain, and the fatigue strength is deteriorated with no modification. For that reason, when the surface is cut, the compressive residual stress can be given the uppermost surface, thereby improving the fatigue strength.

A cage 28 offsets a center curvature O3 of the outer spherical surface 28a and a center curvature O4 of the inner spherical surface 28b with respect to the joint center (cage center) O by regular distances k2 in opposite axial directions, and makes the offset amount of the cage 28 substantially as large as the offset amount of the track grooves.

For that reason, the outer spherical surface 28a of the cage 28 is capable of forming a circular arc portion (concentric circular arc portion different in the radius curvature) that is substantially concentric with the groove bottom of the back side track grooves 22a of the outer ring 23, thereby making it possible to prevent the track groove depth of the joint back side from being made shallow, and also to increase the thickness (radial thickness) of the opening side of the cage 28.

Figure 3:
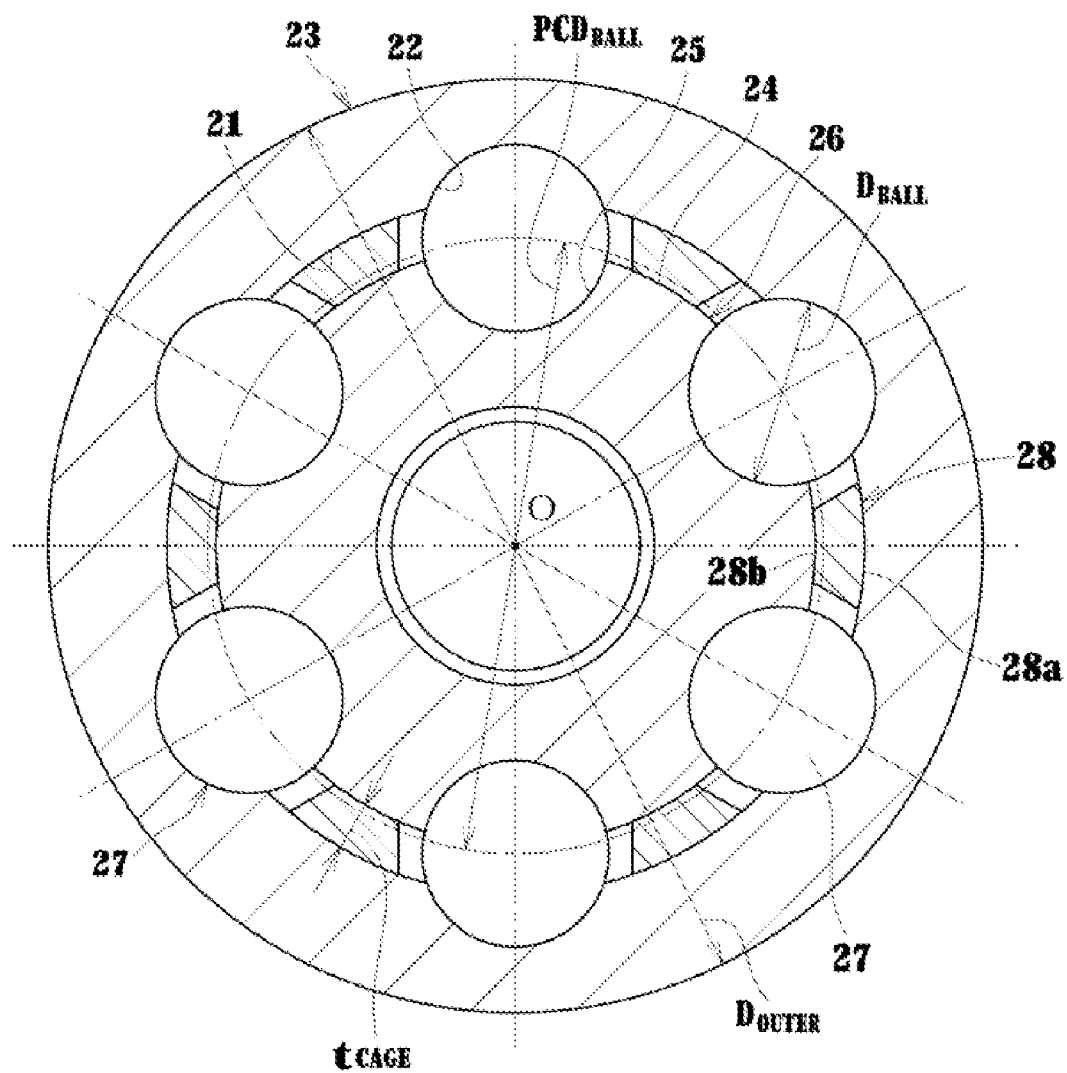
FIG. 3 A lateral cross-sectional view showing the fixed type constant velocity universal joint.

As shown in FIG. 3, it is assumed that the cage thickness at the pocket center position of the cage 28 is $t_{CAGE}$, the pitch circle radius of the ball 27 when the operating angle is 0° is $PCR_{BALL}$, and $t_{CAGE}/PCR_{BALL}$ which is the ratio of the cage thickness and the pitch circle radius is equal to or higher than 0.20 and equal to or lower than 0.23.

Also, as shown in FIG. 3, it is assumed that a ratio r1 of the pitch circle diameter $PCD_{BALL}$ of the ball 27 and a diameter DBALL of the ball 27 is equal to or higher than 3.0 and equal to or smaller than 3.3. That is, $3.0 \leq r1 \leq 3.3$ is satisfied. It is assumed that a ratio r2 of the outer diameter $D_{OUTER}$ of the outer ring 23 and the diameter PCDBALL of the ball 27 is equal to or higher than 4.6 and equal to or smaller than 4.8. That is, $4.4 \leq r2 \leq 4.8$ is satisfied.

Here, the pitch circle radius $PCR_{BALL}$ is the radius of the locus of a circle which is drawn by the ball center, and the pitch circle diameter $PCD_{BALL}$ is the diameter of the locus of a circle that is drawn by the ball center. That is, the pitch circle diameter $PCD_{BALL}$ is defined by twice as large as a length PCR of a line segment that connects the center curvature O1 of the track grooves 22 of the outer ring 23 or the center curvature O2 of the track grooves 25 of the inner ring 26, and the center Q of the torque transmission ball 27 ($PCD_{BALL} = PCR \times 2$).

Figure 4:
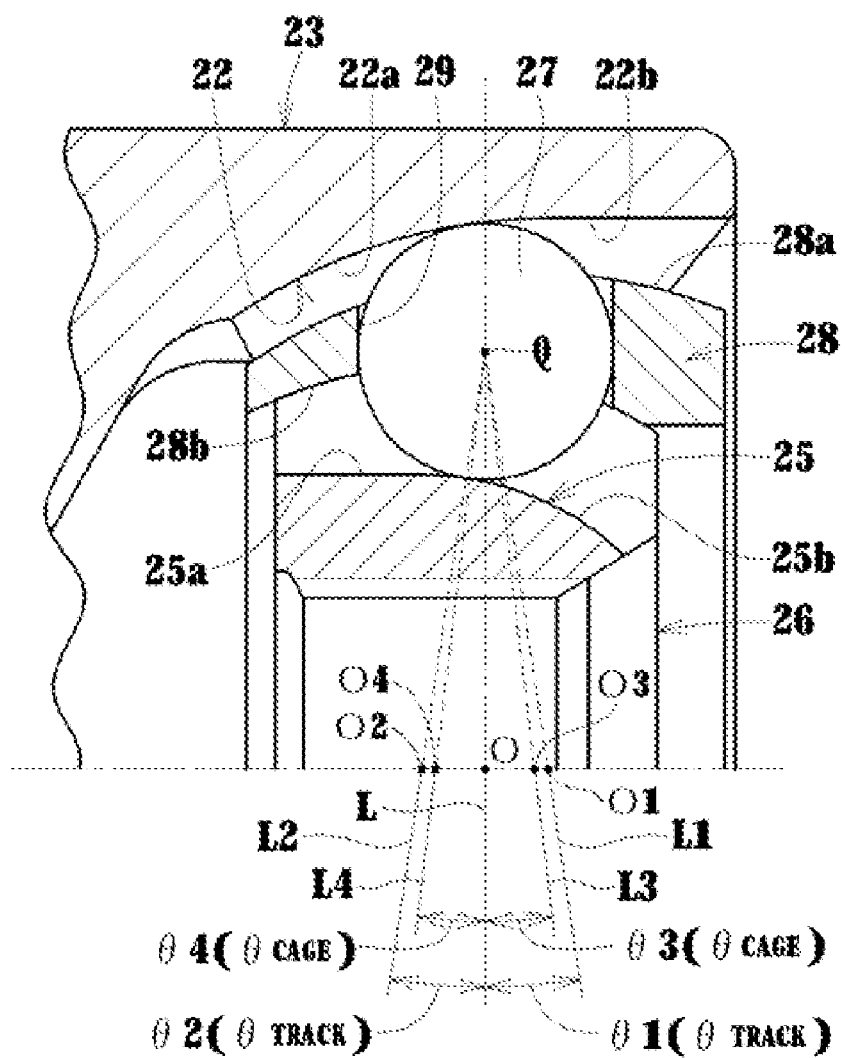
FIG. 4 A longitudinal cross-sectional view showing a main portion of the fixed type constant velocity universal joint.

As shown in FIG. 4, when the operating angle is 0°, an angle θ3 that is defined by a line L3 that connects the center curvature O3 of the outer spherical surface 28a of the cage 28 and the ball center Q, and a line L that connects the joint center O and the ball center Q, and an angle θ4 that is defined by a line L4 that connects the center curvature O4 of the inner spherical surface 28b of the cage 28 and the ball center Q, and a line L that connects the joint center O and the ball center Q are set to be equal to or higher than 2.7° and equal to or lower than 5.7°, respectively. The angles θ3 and θ4 are called "cage offset angle ($\theta_{CAGE}$)". Also, that the operating angle is 0° is a state in which the axis line of the outer ring 23 and the axis line of the inner ring coincide with each other. That is, $2.7° \leq \theta_{CAGE} \leq 5.7°$ is satisfied.

Figure 26:
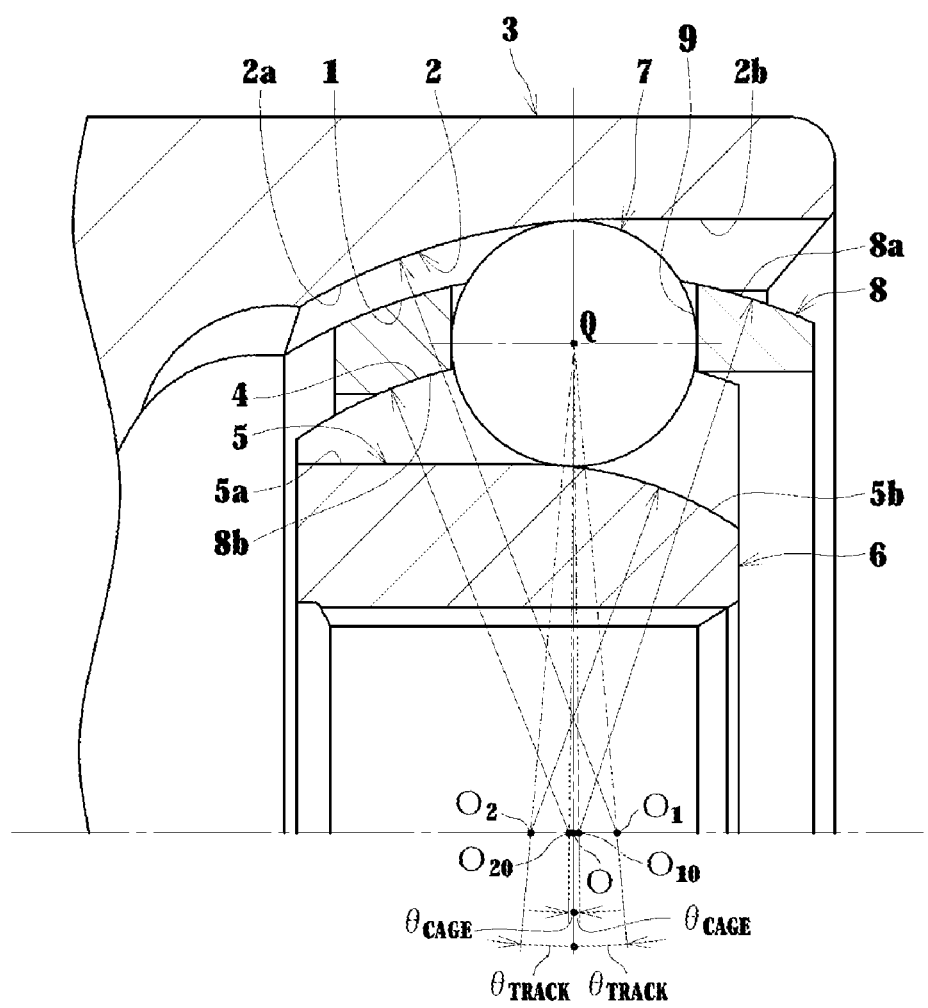
FIG. 26 A longitudinal cross-sectional view showing the conventional fixed type constant velocity universal joint.

As described above, the offset angle $\theta_{CAGE}$ of the cage is set to be larger than the offset angle ($0° < \theta_{CAGE} < 1°$) of the conventional cage shown in FIG. 26, thereby forming the thickness of the end of the joint opening side of the cage 28 to be larger than those of other portions. With the above configuration, even if the cage 28 is thinned for the purpose of reducing the joint in size and weight, the end of the cage at the joint opening side is capable of ensuring the strength that is capable of withstanding a load which is exerted when the joint rotates at high operating angle.

When the offset angle $\theta_{CAGE}$ of the cage satisfies $\theta_{CAGE} < 2.7°$, the end of the joint opening side of the cage 28 is thinned, and the sufficient strength cannot be ensured. Also, when $5.7° < \theta_{CAGE}$ is satisfied, the thickness of the end of the joint back side of the cage 28 is extremely thinned. Heat treatment is generally conducted in a process of manufacturing the cage. However, when the thickness of the cage 28 is extremely thinned, an uncured layer due to the heat treatment is reduced in the portions having the thin thickness, and the toughness is deteriorated, thereby making it impossible to ensure the sufficient strength. Also, when the thickness difference between the end of the cage 28 at the joint opening side and the end thereof at the joint back side is large, there is a risk that the workability is deteriorated.

Also, when the operating angle is 0°, an angle θ1 that is defined by a line L1 that connects the center curvature O1 of the track groove 22 of the outer ring 23 and the ball center Q, and a line L that connects the joint center O and the ball center Q, and an angle θ2 that is defined by a line L2 that connects the center curvature O2 of the track groove 25 of the inner ring 26 and the ball center Q, and the line L that connects the joint center O and the ball center Q are set to be substantially identical with the offset angle ($\theta_{CAGE}$), respectively. The angle θ1 and the angle θ2 are called "track offset angle ($\theta_{TRACK}$)". In this embodiment, the center curvature O1 of the track grooves 22 of the outer ring 23 is arranged toward the joint anticenter side from the center curvature O3 of the outer spherical surface 28a of the cage 28, and the center curvature O2 of the track grooves 25 of the inner ring 26 is arranged toward the joint anticenter side from the center curvature O4 of the inner spherical surface 28b of the cage 28. Accordingly, in this embodiment, the track offset angle ($\theta_{TRACK}$) is set to be slightly larger than the cage offset angle ($\theta_{CAGE}$).

In the present invention, since the number of balls is six, the relatively large balls can be used. For that reason, the allowable torque capacity of one ball can be ensured, and the universal joint can be arranged in a small PCD, that is, the outer diameter can be downsized. Since the thickness of the pillar portions between the pockets of the cage 28 can be also thickened, the strength at high operating angle can be ensured.

Incidentally, when $t_{CAGE}/PCR_{BALL}$ is lower than 0.20, the outer diameter is larger, the downsizing is difficult, the thickness of the cage is thin, and it is difficult to ensure the required joint strength at large angle. On the other hand, when $t_{CAGE}/PCR_{BALL}$ exceeds 0.23, the thickness of the inner ring (inner joint member) in the inner diameter serration section (shaft fitting section) is thin, it is difficult to ensure the required joint strength at large angle (at high operating angle), and the spheres of the inner ring 26 and the outer ring 23 are small, to thereby deteriorate the allowable torque level. As a result, the balls 27 are liable to run on the edge portions of the track grooves 25 and 22 of the inner ring 26 and the outer ring 23, resulting in a risk that the durability is remarkably deteriorated.

For that reason, when $0.20 \leq t_{CAGE}/PCR_{BALL} \leq 0.23$ is satisfied, it is possible to improve a reduction in size and the cage strength, and further the ball 27 can be prevented from running on the edge portion of the track grooves. That is, according to the present invention, the downsizing (reduction in size) can be realized, and the strength of the cage 28 can be ensured even if the reduction in size is realized. Further, the cage damage at the time of a high angle torsion torque load can be prevented, and the high angle strength can be improved. For that reason, the joint strength durability that is equal to or higher than that of the conventional product (fixed type joint of eight balls) can be ensured with a more downsized form.

Also, the ratio of the pitch circle diameter $PCD_{BALL}$ of the ball 27 and the diameter of the ball 27 is equal to or higher than 3.0 and equal to or lower than 3.3, thereby making it possible to provide the high-precision constant velocity universal joint which is capable of ensuring the strength and durability for the constant velocity universal joint. It is assumed that the ratio of the pitch circle diameter $PCD_{BALL}$ and the diameter of the ball 27 is r1. Then, in the case where r1<3.0, when the diameter of the ball 27 is large, the thickness of the inner ring 26 is too thin, and the strength becomes a concern. When the pitch circle diameter of the ball 27 is small, the surface pressures between the inner and outer rings 26 and 23 and the balls are larger, and the durability becomes a concern. In contrast, when r1>3.3 is satisfied, when the diameter of the ball 27 is small, the load capacity of the ball 27 is smaller, and the durability becomes a concern. When the pitch circle diameter of the ball 27 is large, the thickness of the outer ring 23 is too thin, and the strength becomes a concern, or the outer diameter of the outer ring is larger, thereby making it impossible to achieve the downsizing.

It is preferable that a ratio of the outer diameter of the outer ring 23 and the diameter of the ball 27 be set to be equal to or higher than 4.6 and equal to or lower than 4.8. With the above arrangement, the strength and the durability can be further ensured. It is assumed that a ratio of the outer diameter of the outer ring 23 and the diameter of the ball 27 is r2 and that r2<4.6 is satisfied. Then, when the diameter of ball 27 is large, the thickness of the outer ring 23 is too thin, and the strength becomes a concern. When the outer diameter of the outer ring 23 is small, the surface pressures between the inner and outer rings 26 and 23 and the balls 27 are larger, and the durability becomes a concern. In contrast, in the case where r2>4.8 is satisfied, when the diameter of the ball 27 is small, the load capacity of the ball is smaller, and the durability becomes a concern. When the diameter of the outer ring 23 is large, the downsizing cannot be achieved.

The angles θ3 and θ4 of the cage 28 are set to be equal to or higher than 2.7° and equal to or lower than 5.7°, thereby making it possible to make the thickness of the end of the joint opening side of the cage 28 larger than those of other portions. Even if the cage 28 is thinned for the purpose of reducing the joint in size and weight, the end of the cage at the joint opening side is capable of ensuring the strength that is capable of withstanding a load which is exerted on the joint when the joint rotates at high operating angle. When the angles (offset angles) θ3 and θ4 of the cage 28 are set to be equal to or higher than 2.7° and equal to or lower than 5.7°, the thickness of the end of the joint opening side of the cage 28 is made larger than those of other portions. When the offset angles θ3 and θ4 of the cage 28 are set to be lower than 2.7°, the end of the joint opening side of the cage 28 is made thinner, and the sufficient strength cannot be ensured. Also, when the offset angles θ3 and θ4 of the cage 28 exceed 5.7°, the thickness of the end of the joint back side of the cage 28 becomes extremely thinned. Heat treatment is generally conducted in a process of manufacturing the cage. However, when the thickness of the cage 28 is extremely thinned, an uncured layer due to the heat treatment is reduced in the portions having the thin thickness, and the toughness is deteriorated, thereby making it impossible to ensure the sufficient strength. Also, when the thickness difference between the end of the cage 28 at the joint opening side and the end thereof at the joint back side is large, there is a risk that the workability is deteriorated.

Also, in the present invention, the offset amount k of the cage 28 is made substantially as large as the offset amounts of the track grooves 22 and 25. For that reason, the track groove depth at the joint back side can be prevented from being made shallow, and the thickness (thickness in the radial direction) of the cage 28 at the opening side can be increased. For that reason, the ball 27 at high angle can be prevented from running on the track edge portion, and an excessive stress is not exerted on the edge. That is, the torsion torque load capacity at high angle is prevented from being deteriorated, thereby enabling an improvement (amelioration) in the high angle durability life and an improvement (amelioration) in the failure strength which is caused by the plastic deformation of the track grooves 25 and 22 of the inner ring 26 and the outer ring 23 at high angle.

Since the track grooves 22 of the outer ring 23 and the track grooves 25 of the inner ring 26 can be formed through plastic forming, cutting, or quenching steel cutting, the track groove forming of the inner ring 26 and the outer ring can be simply conducted without requiring any specific forming method.

Figure 5:
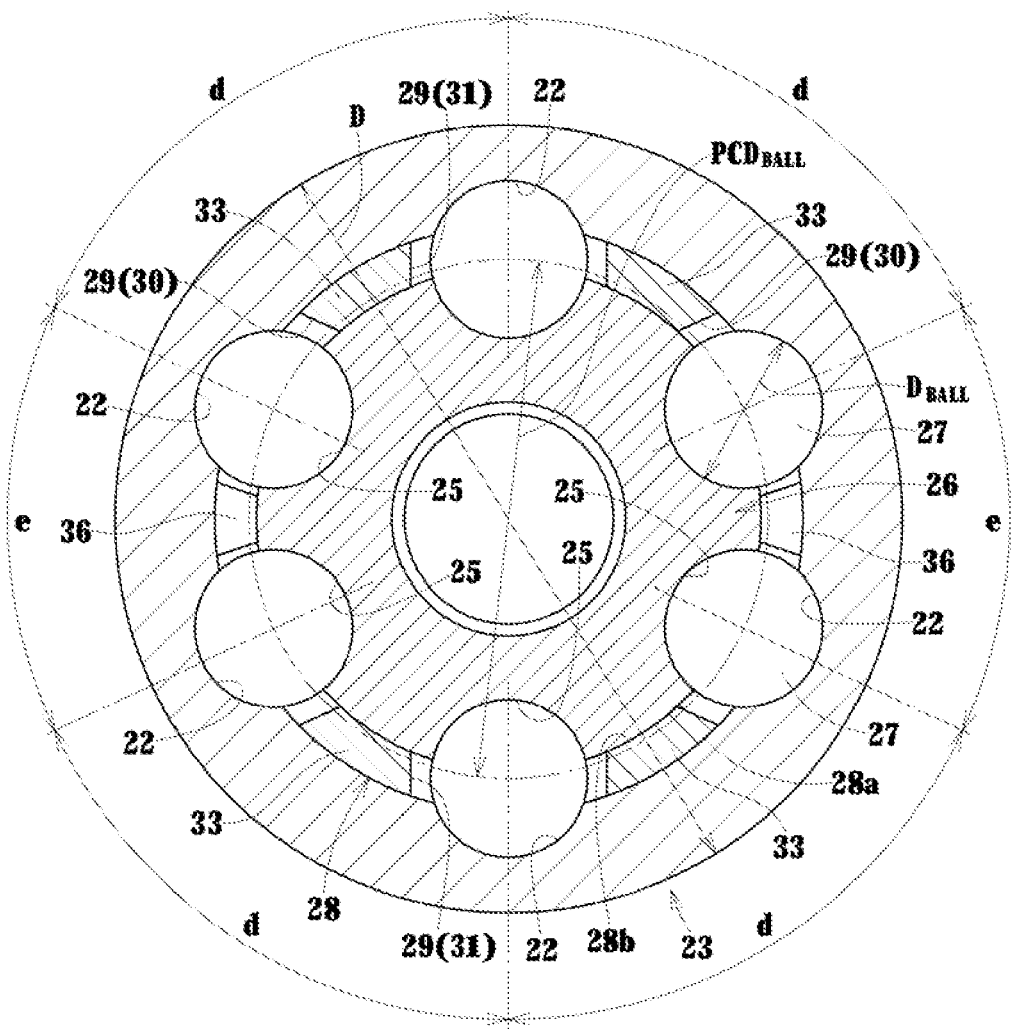
FIG. 5 A lateral cross-sectional view showing a fixed type constant velocity universal joint according to another embodiment of the present invention.

FIG. 5 shows another embodiment, and the cage 28 in this case includes four pockets including a pair of long pockets 30 that are large in the circumferential interval, and a pair of short pockets 31 that are small in the circumferential interval. Then, the pair of long pockets 30 are displaced along the circumferential direction by 180 degrees, and the pair of short pockets 31 are displaced along the circumferential direction by 180 degrees, so as to alternately dispose the long pockets 30 and the short pockets 31 along the circumferential direction. Therefore, the number of pillar portions (cage pillar portions) 33 which are disposed between the pockets is four. Then, each of the long pockets 30 receives two balls 27, and each of the short pockets 31 receives one ball 27.

Figure 6:
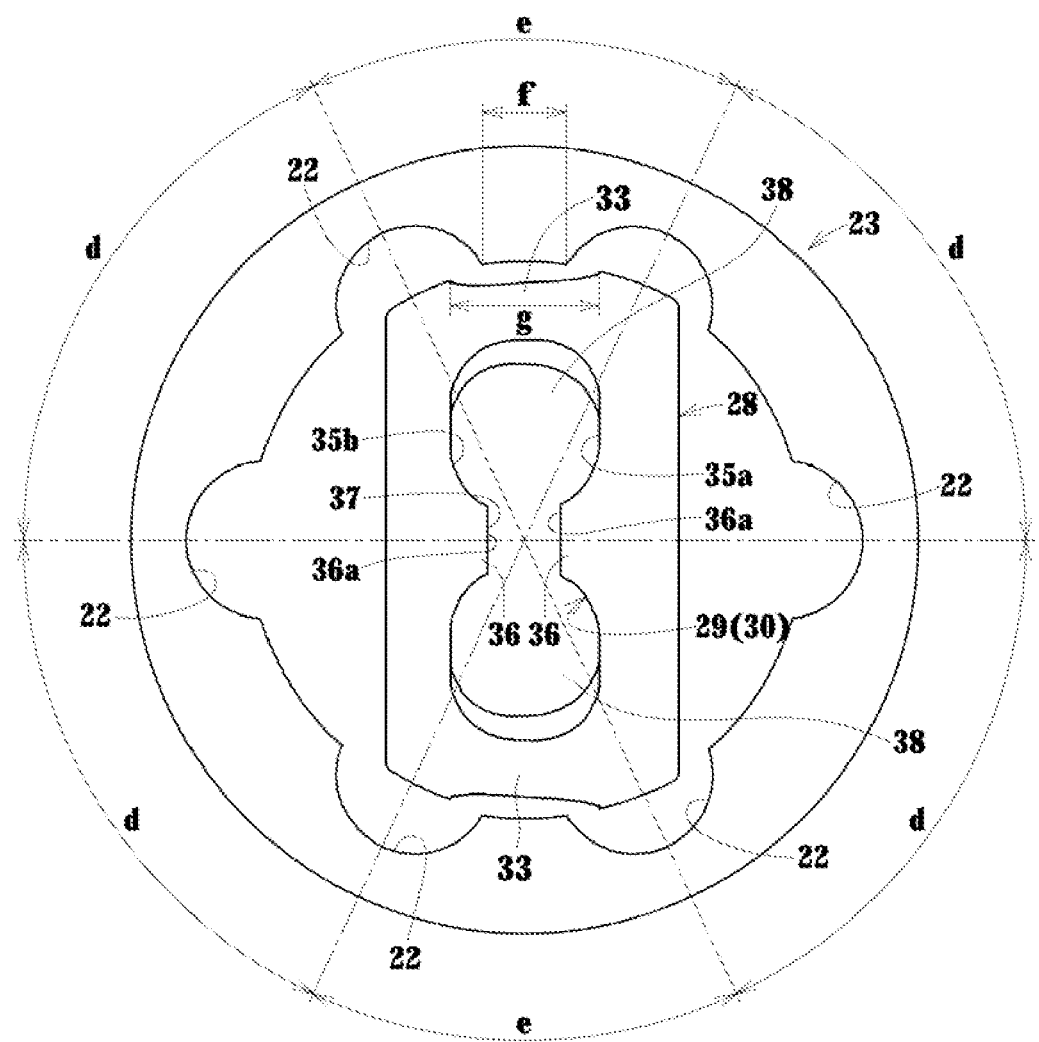
FIG. 6 A front view showing a relationship between an outer ring and a cage of the fixed type constant velocity universal joint shown in FIG. 5.

Pitch angles e of two balls 27 which are received in the long pocket 30 on the PCD are made smaller than 60 degrees, and pitch angles d of other balls 27 are made larger than 60 degrees. For that reason, as shown in FIG. 6, a shoulder width dimension f between two track grooves of the outer ring 23 corresponding to the long pocket 30 of the cage 28 is set to be smaller than a pocket width g in the axial direction of the cage. That is, the respective track grooves 25 and 22 of the inner ring 26 and the outer ring 23 are arranged at irregular pitches in the circumferential direction, and a circumferential length (shoulder width dimension between the track grooves) f of the opening side end of the inner spherical surface which is disposed within the minimum pitch among the plurality of inner spherical surfaces which are disposed between the mutual track grooves of the outer ring 23 is set to be smaller than the pocket width g of the cage 28. Also, as shown in FIG. 7, an axial length i of the inner ring is shorter than a circumferential interval h of the long pocket 30.

Figure 7:
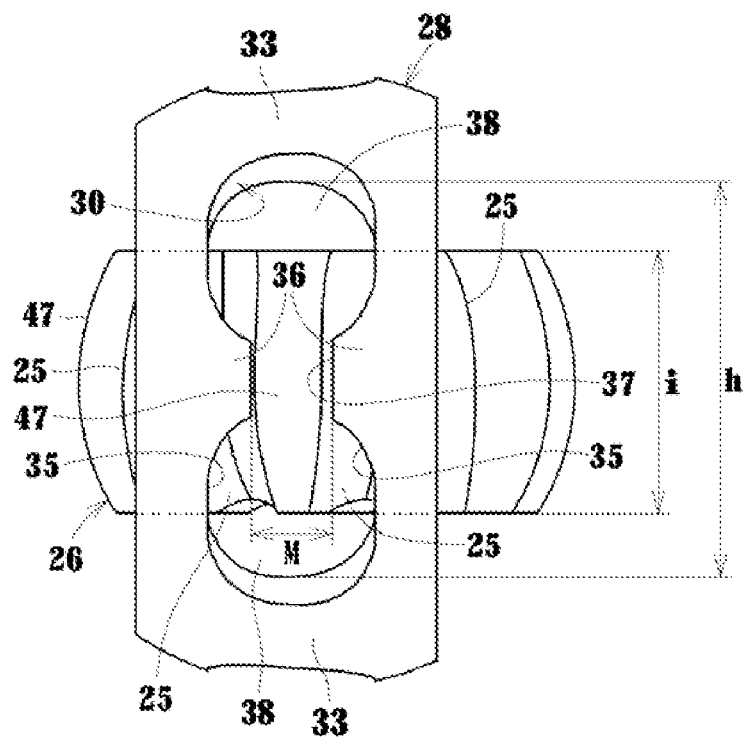
FIG. 7 A side view showing a relationship between an inner ring and the cage of the fixed type constant velocity universal joint shown in FIG. 5.
Figure 8:
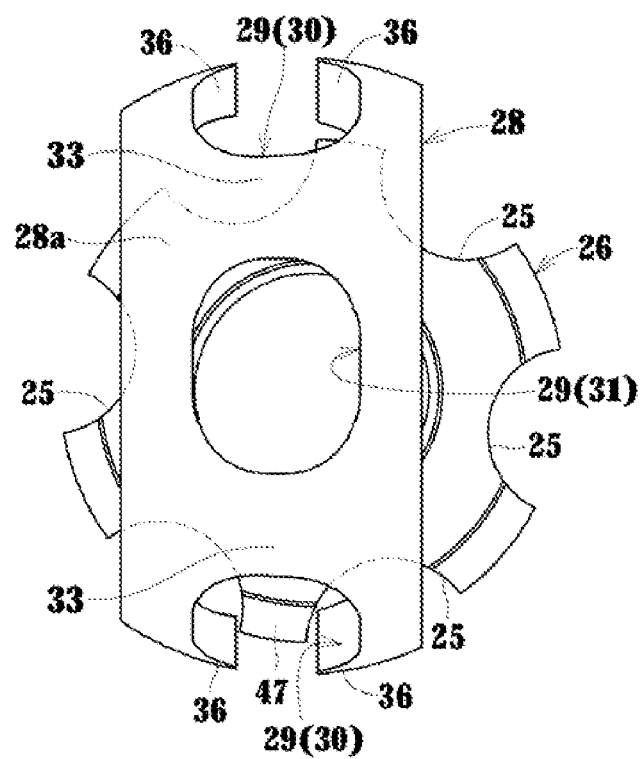
FIG. 8 A side view showing a state in which the inner ring is incorporated into the cage in the fixed type constant velocity universal joint shown in FIG. 5, and a cross-sectional view showing the inner ring of the fixed type constant velocity universal joint.

Incidentally, as shown in FIGS. 6 and 7, expansion portions 36 and 36 that project to inward of each long pocket are disposed in the centers of the longitudinal direction at opposed long sides 35a and 35b of the long pocket 30 in the long pocket 30 to form two ball-receiving sections 38 and 38 which are connected to the long pocket 30 through a slit 37. Also, the outer surfaces of the expansion portions 36 and 36 are continuous spherical surfaces having the same radius curvature as that of the outer spherical surface 28a of the cage 28, and the inner surfaces of the expansion portions 36 and 36 are continuous spherical surfaces having the same radius curvature as that of the inner spherical surface 28b of the cage 28. In this embodiment, the configuration of the expansion portion 36 is a trapezoidal shape whose sides are circular arc surfaces when viewed from the cage outer circumferential side. For that reason, projection end surfaces 36a of the respective expansion portions 36 are flat surfaces that extend along the cage circumferential direction, and face (are opposed to) each other at given intervals M.

As shown in FIG. 7, the given interval M is a dimension that does not interfere with a shoulder portion 47 (projection between the adjacent track grooves) of the inner ring 26 at the time of assembling. Also, the size and configuration of the expansion portions 36 must be so designed as not to inhibit the motion of the balls 27 that are received in the ball receiving portion 38 when the joint rotates with an operating angle. The expansion portions 36 can be formed through a machining process or a plastic forming process when the long pockets 30 are formed.

As described above, the cage 28 includes four pockets including the pair of long pockets 30 that are large in the circumferential interval, and the pair of short pockets 31 that are small in the circumferential interval. Further, the pair of long pockets 30 are displaced along the circumferential direction by 180 degrees, and the pair of short pockets 31 are displaced along the circumferential direction by 180 degrees, so as to alternately dispose the long pockets 30 and the short pockets 31 along the circumferential direction. With the above configuration, the number of pillar portions 33 which are disposed between the pockets of the cage 28 can be set to four, and the circumferential length of one pillar portion 33 can be increased.

As a result, since the rigidity of the respective cage pillar portions 33 can be enhanced, the large balls 27 can be arranged in the small PCD, and downsizing can be conducted as the fixed type constant velocity universal joint that can be downsized without deteriorating the load capacity. Further, the cage 28 can be prevented from being damaged by the torsion torque load at high angle. Also, the provision of the long pockets 30 makes it easy to incorporate the inner ring 26 into the cage 28. That is, the incorporation of the inner ring 26 into the cage 28 is conducted by dropping one shoulder portion of the inner ring 26 in one long pocket 30 as shown in FIGS. 6 and 7. Therefore, the long pocket 30 is used for the pocket 29 into which the shoulder portion 47 is dropped, thereby being capable of improving the workability.

The provision of the expansion portions 36 and 36 in the long pocket 30 makes it possible to improve the rigidity of a frame (window frame) for constituting the long pocket 30. As a result, the cage 28 can be prevented from being deformed due to the shortage of the rigidity of the window frame, the actuation property of the joint is not impaired, and the actuation property that is stable for a long period of time can be exerted.

Further, an interference of the inside low edge portion of the opening (inlet portion) of the outer ring 23 with the pocket edge portion of the cage outer spherical surface 28*a* side can be delayed or eliminated by the expansion portion 36 of the long side 35*a* side at the joint opening side when the operating angle is taken. An interference of the back side edge portion of the outer spherical surface 24 of the inner ring 26 with the pocket edge portion of the cage inner spherical surface 28*b* side can be delayed or eliminated by the expansion portion 36 of the long side 35*b* of the joint back side. For that reason, the cage 28 is easily guided to the inner spherical surface 21 of the outer joint member or the outer spherical surface 24 of the inner joint member, the actuation property of the joint can be prevented from being deteriorated, and the crack or breakage of the cage 28 can be effectively prevented together with the prevention of the deterioration of the actuation property of the joint due to an improvement in the rigidity of the window frame.

As described above, in the fixed type constant velocity universal joint shown in FIG. 5 or the like, the respective track grooves 25 and 22 of the inner ring 26 and the outer ring 23 are arranged at the irregular pitches in the circumferential direction, and the circumferential length f of the opening side end of the inner spherical surface which is disposed within the minimum pitch among the plurality of inner spherical surfaces that are arranged between the mutual track grooves of the outer ring 23 is set to be smaller than the width g of the pocket 29 of the cage 28.

With the above configuration, when the cage 28 is incorporated while facing the outer ring 23, the pocket 29 of the cage 28 is incorporated while facing the inner spherical surface that is disposed within the minimum pitch of the outer ring 23. In this case, since the circumferential length of the opening side end of the inner spherical surface which is disposed within the minimum pitch is set to be smaller than the width of the pocket 29 of the facing cage 28, the cage 28 can be easily incorporated into the outer ring 23 without any interference of the inner spherical surface with the outer circumferential surface of the cage 28.

Also, the phase of two pitches which are symmetrically positioned with respect to the joint center among the pitches between the respective mutual track grooves of the inner ring 26 and the outer ring 23 is set to be smaller than 60°, the phases of the remaining four pitches are set to be larger than 60°, and the circumferential length f of the opening side end of the inner spherical surface of the outer ring 23 which is disposed within the pitch of the phase which is smaller than 60° is set to be smaller than the width of the pocket 29 of the cage 28.

In the above case, the cage 28 can be readily incorporated into the outer ring 23. Also, since the inner spherical surface (opening side end) having the circumferential length which is smaller than the width of the pocket 29 is symmetrically arranged with respect to the joint center, the cage 28 is further easily incorporated into the outer ring 23.

Figure 9A:
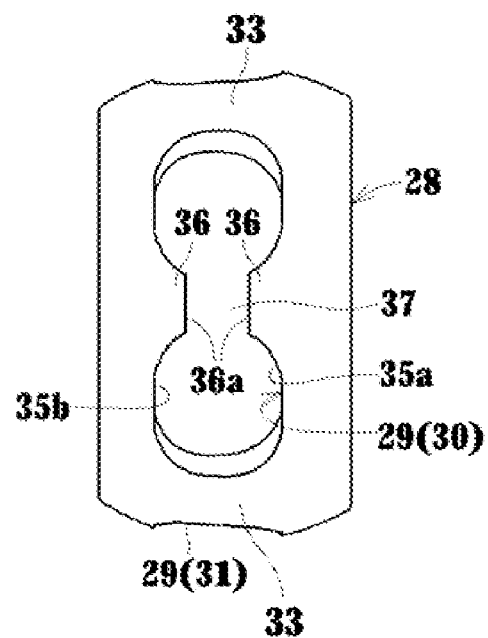
FIG. 9A A side view showing the cage of the fixed type constant velocity universal joint shown in FIG. 5.
Figure 9B:
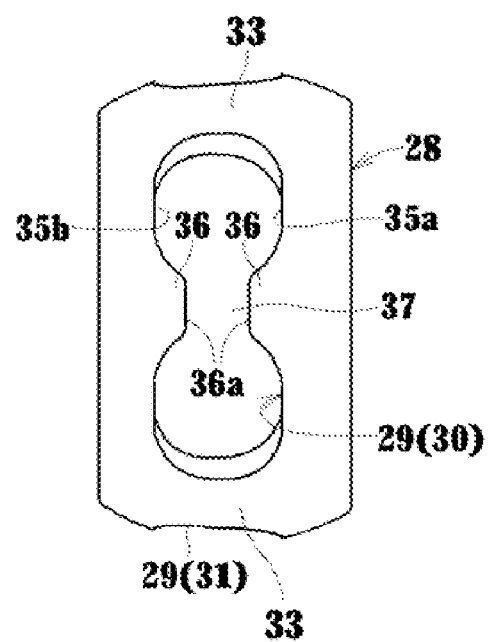
FIG. 9B A side view showing a first modified example of the cage.
Figure 9C:
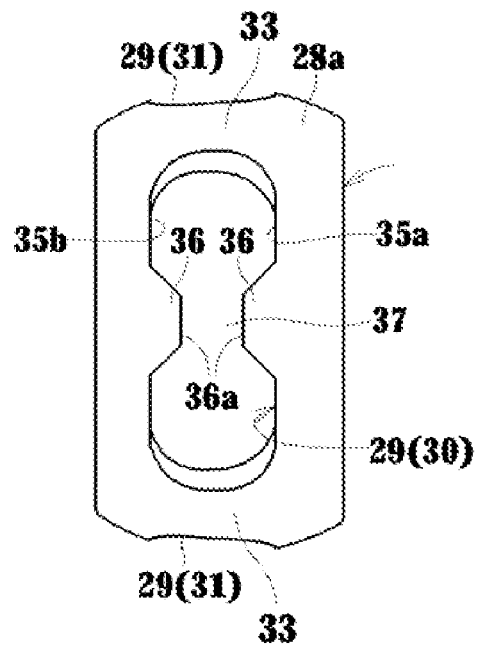
FIG. 9C A side view showing a second modified example of the cage.
Figure 9D:
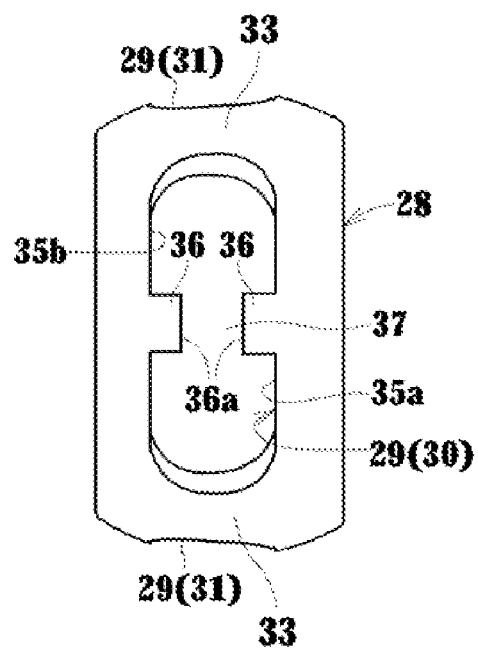
FIG. 9D A side view showing a third modified example of the cage.

The long pocket 30 according to the above embodiment has the expansion portions 36 and 36 that are of the so-called trapezoidal configuration as shown in FIG. 9A. Alternatively, the expansion portions 36 and 36 may be of the configurations as shown in FIGS. 9B, 9C, and 9D. That is, in the expansion portions 36 and 36 of FIG. 9B, the corner portions of the projection end surfaces 36*a* of the expansion portions 36 are of an R-configuration. The expansion portions 36 and 36 of FIG. 9C are of a trapezoidal configuration in which base portions of the corner portions are not smooth, and the expansion portions 36 and 36 of FIG. 9D are of a rectangular configuration.

The cages 28 having the long pockets 30 that are configured as shown in FIGS. 9B, 9C, and 9D have the same effects as that of the cage 28 of FIG. 9A.

Figure 10A:
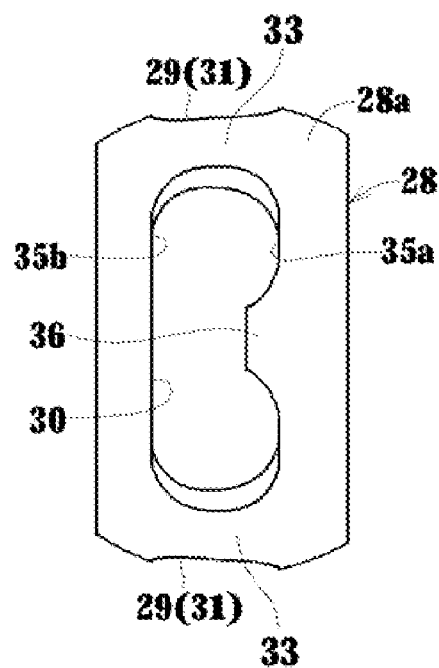
FIG. 10A A side view showing a fourth modified example of the cage.
Figure 10B:
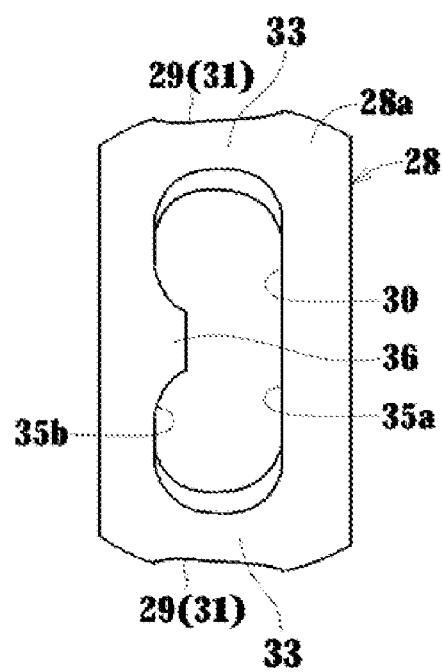
FIG. 10B A side view showing a fifth modified example of the cage.

Also, as shown in FIG. 10, any one of the pair of expansion portions 36 and 36 can be omitted. In FIG. 10A, the expansion portion 36 is disposed on only the long side 35*a* side of the joint opening portion side, and in FIG. 10B, the expansion portion 36 is disposed on only the long side 35*b* side of the joint opening portion side.

In the configuration shown in FIG. 10A, an interference of the inner low edge portion of the opening (inlet portion) of the outer ring 23 with the pocket edge portion of the cage outer spherical surface 28*a* side can be delayed or eliminated. In the configuration shown in FIG. 10B, an interference of the back side edge portion of the outer spherical surface 24 of the inner ring 26 with the pocket edge portion of the cage inner spherical surface 28*b* side can be delayed or eliminated.

Figure 11:
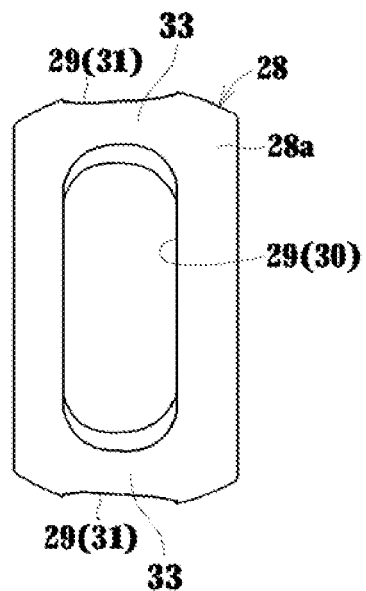
FIG. 11 A side view showing a sixth modified example of the cage.
Figure 12:
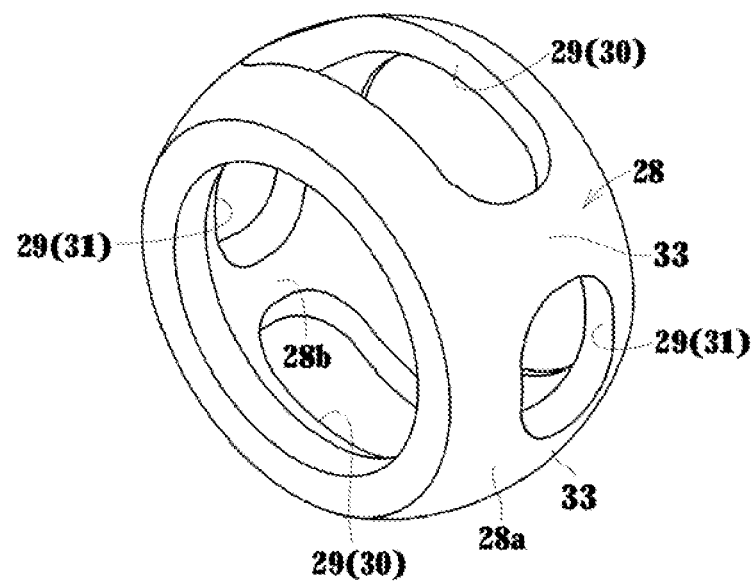
FIG. 12 A perspective view showing the sixth modified example of the cage.

Also, as shown in FIGS. 11 and 12, a long circular hole having no expansion portion 36 can be provided for the long pocket 30. This configuration cannot obtain the effects of the expansion portion 36, but can achieve an improvement in property of incorporating the inner ring 26 into the cage 28 and an improvement in lightweight property.

Incidentally, in the case of manufacturing the cage 28 having the long pocket 30, the pillar portions between the adjacent pockets in the circumferential direction can be removed in the existing cage in which the pockets are formed at pitches of 60° along the circumferential direction. That is, a pair of pillar portions in opposite directions by 180° with respect to the cage center can be removed. This removing method can be conducted by, for example, press working or a milling process. In the case of the cage 28 shown in FIGS. 9 and 10, a part of the pillar portion to be removed remains, but the entire pillar portion (all) to be removed is removed in the cage 28 shown in FIGS. 11 and 12. In the case where the long pocket 30 is formed, the pillar portions that are disposed within the large pitch can be removed. However, in order to ensure the strength of the cage 28, it is desirable that the pillar portion that is disposed within the small pitch be removed, and the thicker pillar portion that is disposed within the large pitch remain.

As described above, the cage 28 can be simply formed by removing the pillar portion in the existing cage. Further, the pillar portion can be removed by press working or a milling process, and can be stably formed by those diverse plastic forming processes.

When the long pocket 30 that is capable of holding the two torque transmission balls 27 is formed in the cage 28, and a circumferential length h of the long pocket 30 is set to be larger than a width i of the inner ring 26, an improvement in integration property when the inner ring 26 is incorporated into the cage 28 can be improved.

Figure 13:
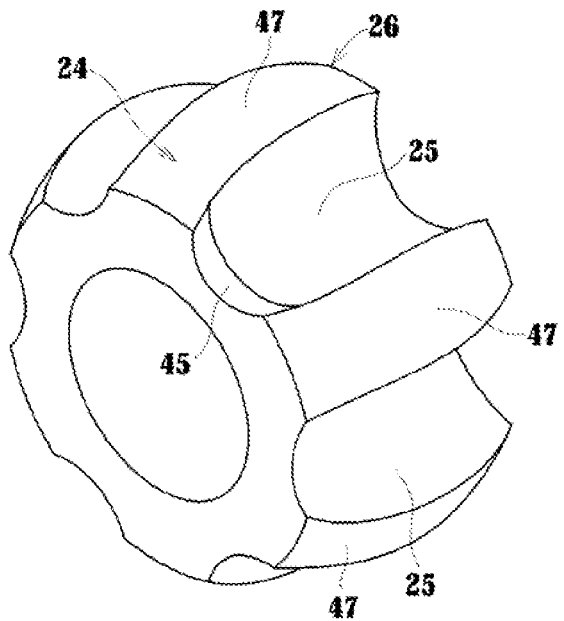
FIG. 13 A perspective view showing a modified example of the inner ring.
Figure 14:
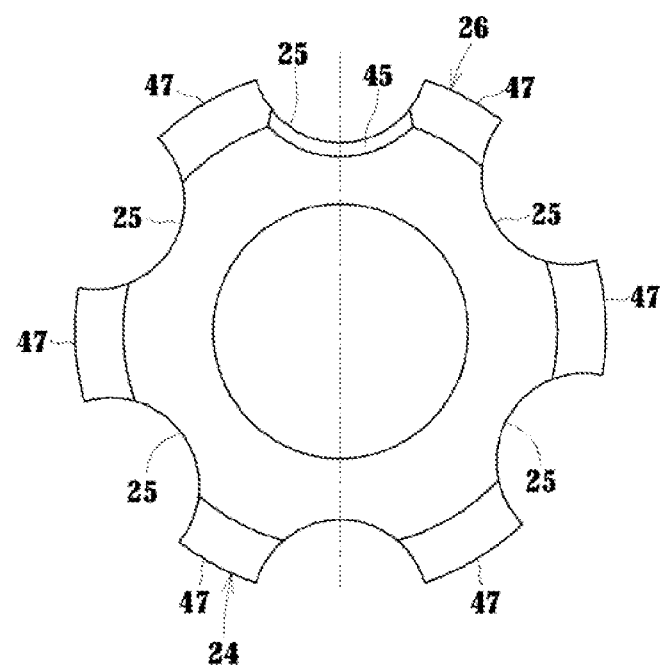
FIG. 14 A front view showing the inner ring shown in FIG. 13.
Figure 15:
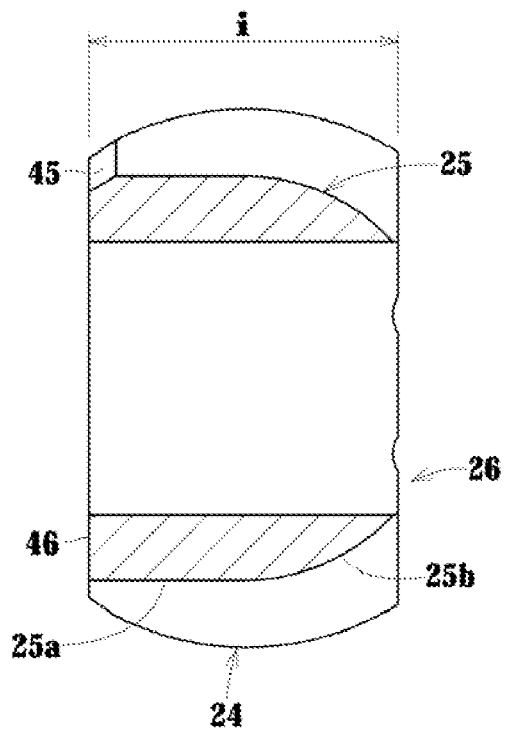
FIG. 15 A cross-sectional view showing the inner ring shown in FIG. 13.

As shown in FIGS. 13 to 15, a notch portion 45 can be disposed in the back side end (terminal edge of the joint back side) of one track groove 25 (25A) of the inner ring 26. In this case, the notch portion 45 is constituted by a tapered surface that is formed on a corner portion of the back side end and an inner ring end surface 46. The notch portion 45 is formed by a slope portion. In this case, the forming can be conducted by a machining process or a plastic forming process.

Figure 16:
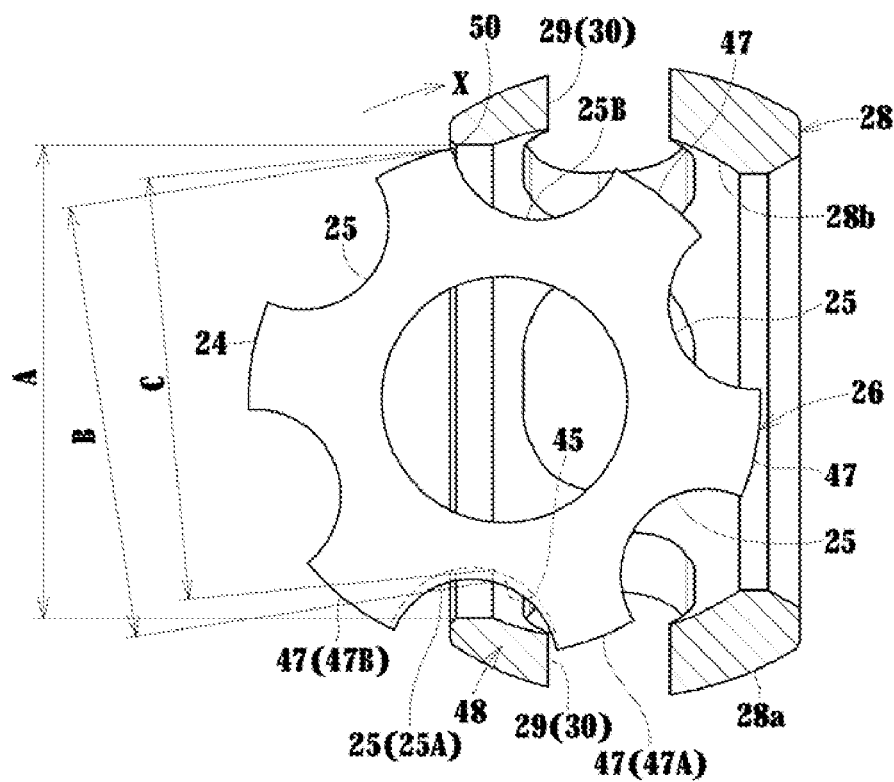
FIG. 16 A cross-sectional view showing a method of incorporating the inner ring shown in FIG. 13 into the cage.

Incidentally, when the inner ring 26 is incorporated into the cage 28, the inner ring 26 is arranged so that its axis line is perpendicular to the axis line of the cage 28 (state in which the inner ring 26 rotates with respect to the cage 28 by 90°). In that state, as shown in FIG. 16, a part of the outer spherical surface 24 of the inner ring 26 (projection 47A between the track grooves 25 adjacent in the circumferential direction) drops into the pocket 29 (long pocket 30) of the cage 28. That is, the track groove 25A where the notch portion 45 is formed is fitted into a side frame portion 48 that is at the thinner side of the pocket 30, the projection 47A that is formed on the counterclockwise side of the track groove 25A drops into the pocket 30 of the cage 28, and the inner ring 26 rotates in a direction indicated by an arrow X centered on the bottom of the notch portion 45. In this situation, the rotation radius C can be made smaller than the rotation radius B having no notch portion 45 (rotation radius of the conventional product). In this example, the rotation radius C is a length between the bottom center portion of the notch portion 45 and one opening edge 50 of the track grooves 25B opposite to the track grooves 25A by 180 degrees.

For that reason, when it is assumed that the inside low diameter of the cage 28 is A, the rotation radius of the inner ring 26 is B in the conventional product and C in the product of the present invention, A-B<A-C is satisfied because of B>C. As a result, the inside low diameter A in the product of the present invention can be made smaller than that of the conventional product, and the thickness of the side frame portion 48 at the thinner side can be increased.

After the inner ring 26 has been fitted into the cage 28, the inner ring 26 rotates with respect to the cage 28 by 90°, the axis line of the inner ring 26 is made to coincide with the axis line of the cage 28, and the inner ring is arranged in a normal posture. As a result, the inner ring 26 can be incorporated into the cage 28.

Figure 17:
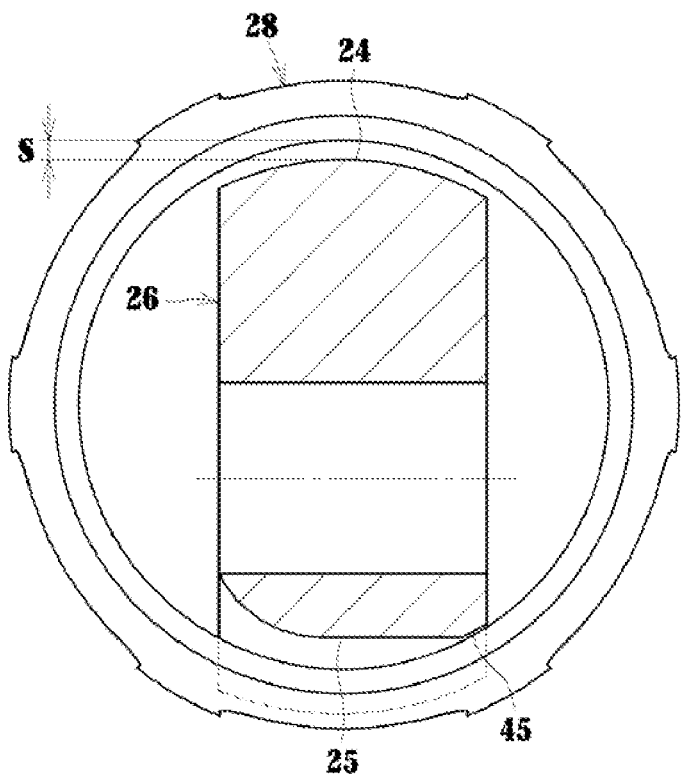
FIG. 17 An explanatory diagram showing a gap that is formed at the time of incorporating the inner ring into the cage.

Since the notch portion 45 is disposed at the back side end of the track groove 25, the inner ring 26 can rotate with the notch portion 45 as a starting point when the inner ring 26 is incorporated into the cage 28, and the rotation radius of the inner ring 26 can be reduced. For that reason, a larger space can be ensured between the inside low inner diameter of the cage 28 and the inner ring 26, and hence the inside low diameter A of the cage 28 can be set to be smaller. That is, as shown in FIG. 17, the notch portion 45 is brought in proximity to or in contact with the inlet portion (inside low portion) in a state where the track grooves 25 of the inner ring 26 where the notch portion 45 is formed is across the inlet portion of the cage 28. That is, the inner ring 26 having the notch portion 45 can be dropped further downward and inserted as compared with the conventional inner ring having no notch portion 45. As a result, since a gap S between the upper end surface of the inner ring 26 and the inlet portion can be widely ensured, the integration is facilitated.

As a result, the cross section area of the cage 28 at the inside low side can be enlarged, the rigidity of the thin side frame portion 48 of the cage 28 can be improved, and the spherical surface contact area can be ensured. As a result, an increase in contact surface pressure can be prevented, the heat generation or the deterioration of the durability can be avoided, and the deformation of the cage 28 and the deterioration of the strength can be also avoided. That is, the rigidity of the cage 28 can be improved without a reduction in load capacity and spherical area of the inner ring 26. Also, since the area of the inner spherical surface 28b of the cage 28 can be increased, there are advantages in that a contact area of the inner ring 26 with the outer spherical surface 24 can be increased, the rigidity is improved, and the durability is stabilized.

The size of the notch portion 45 can be changed to the degree that the rotation radius of the inner ring 26 can be reduced when the inner ring 26 is incorporated into the cage 28. However, when the rotation radius of the inner ring 26 is too large, the strength of the inner ring 26 is weak, and the ball rolling range of the track groove 25 is reduced. Also, when the rotation radius of the inner ring 26 is too small, the rotation radius can be hardly reduced.

Figure 18:
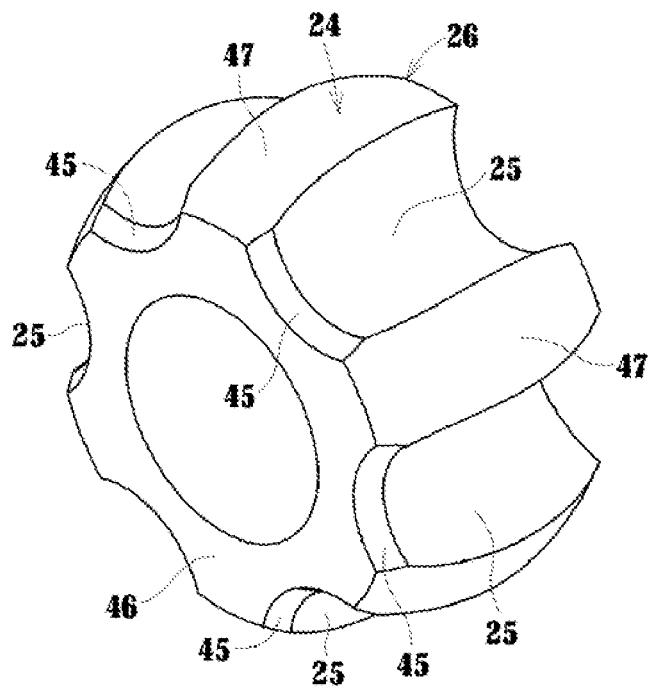
FIG. 18 A perspective view showing another modified example of the inner ring.
Figure 19:
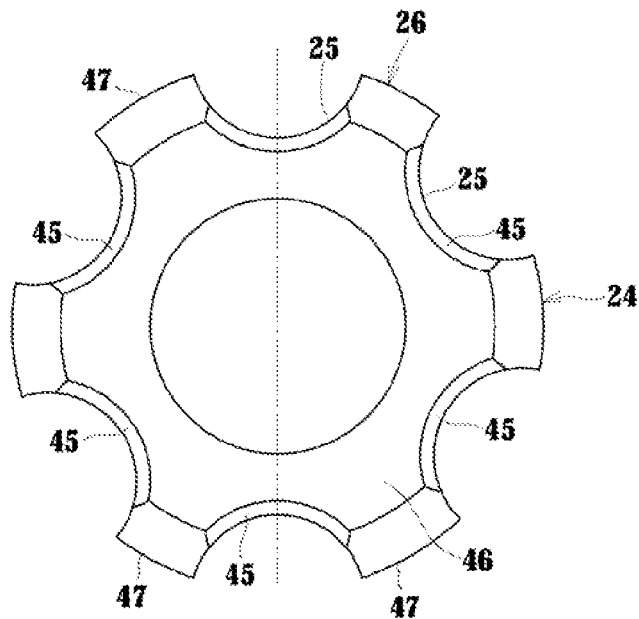
FIG. 19 A front view showing the inner ring shown in FIG. 18.
Figure 20:
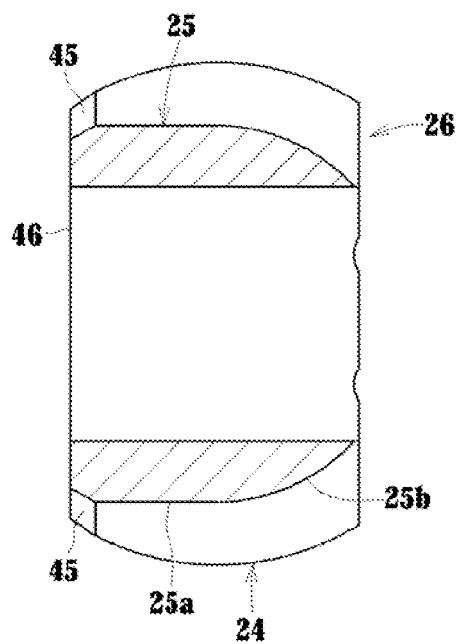
FIG. 20 A cross-sectional view showing the inner ring shown in FIG. 18.

Subsequently, FIGS. 18 to 20 show that the notch portions 45 are formed on the back side end of all the track grooves 25. With this configuration, even in the inner ring 26, the inner ring 26 can be rotated with the notch portion 45 as a starting point when the integration is conducted as with the inner rings 26 shown in FIGS. 13 to 15, and the rotation radius of the inner ring 26 can be reduced. For that reason, the inner rings 26 shown in FIGS. 18 to 20 have the same effects as those of the inner rings 26 shown in FIGS. 11 to 13.

In particular, since the notch portions 45 are formed on the back side end of all the track grooves 25, any projection 47 can be inserted into the pocket 30 when the inner ring 26 is incorporated into the cage 28. For that reason, there is an advantage in that the integration property can be improved.

Figure 21A:
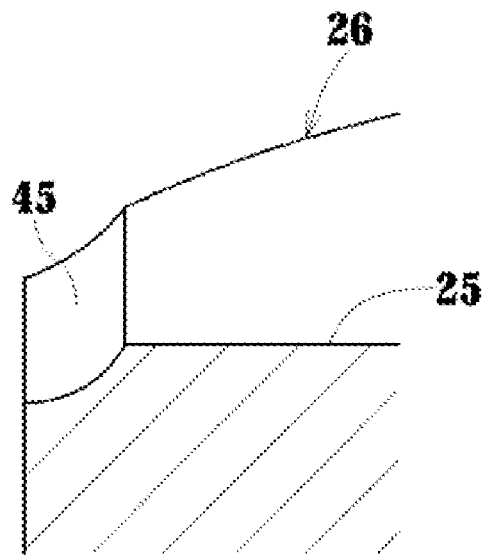
FIG. 21A An enlarged cross-sectional view showing a first modified example of a notch portion that is formed in the inner ring.
Figure 21B:
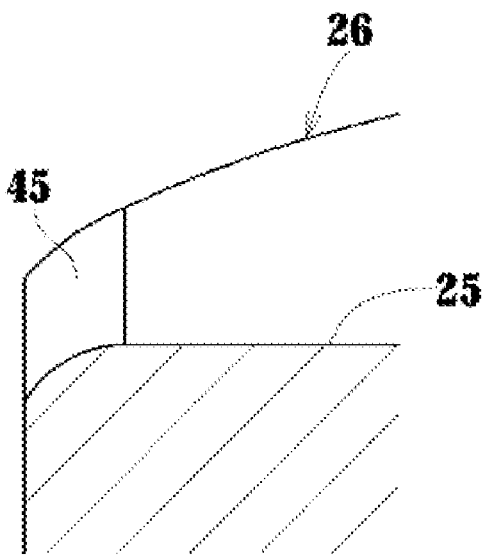
FIG. 21B An enlarged cross-sectional view showing a second modified example of the notch portion that is formed in the inner ring.

Incidentally, in the above respective embodiments, the notch portion 45 is formed into a tapered surface shape that is sequentially reduced in diameter from the opening side track groove 25b side toward the inner ring end surface 46 side. Alternatively, the notch portion 45 can be configured as shown in FIGS. 21A and 21B. The notch portion 45 shown in FIG. 21A is of a concave R-shape, and the notch portion 45 shown in FIG. 21B is of a convex R-shape.

Even with the notch portions 45 shown in FIGS. 21A and 21B, the inner ring 26 can rotate with the notch portion 45 as a starting point when the integration is made, and the rotation radius of the inner ring 26 can be reduced. Also, as shown in FIGS. 22A and 22B, the notch portion 45 can be formed in a part of the track groove ends (bottom portion in the figure).

Figure 22A:
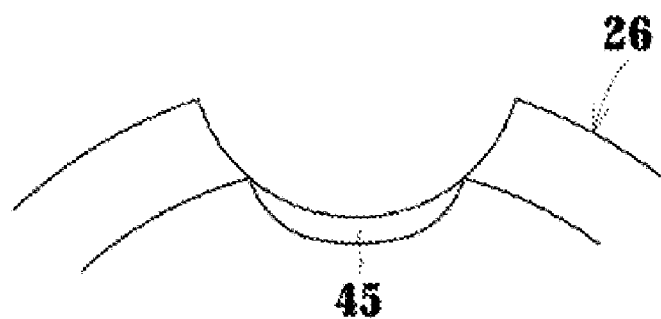
FIG. 22A A front view showing a third modified example of the notch portion that is formed in the inner ring.
Figure 22B:
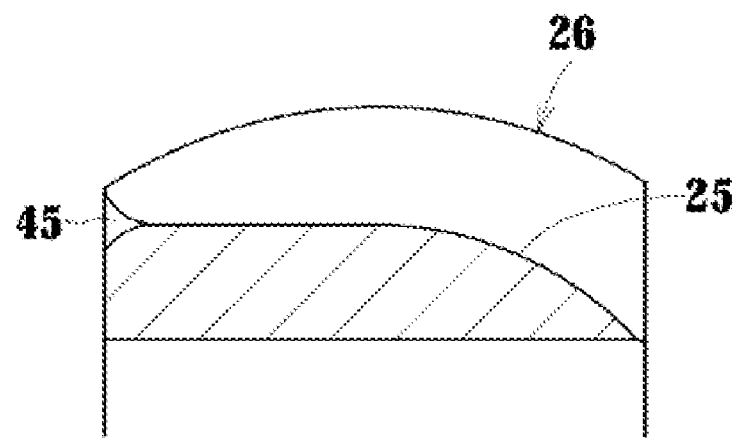
FIG. 22B A cross-sectional view showing the third modified example of the notch portion that is formed in the inner ring.

Although being omitted from the figure, the notch portion 45 can be constituted by, for example, a step portion, other than the configurations shown in FIGS. 13 to 15, the configurations shown in FIGS. 21A and 21B, or the configurations shown in FIGS. 22A and 22B. Similarly, the notch portion 45 such as the step portion also exerts the function of the notch portion 45.

Figure 23:
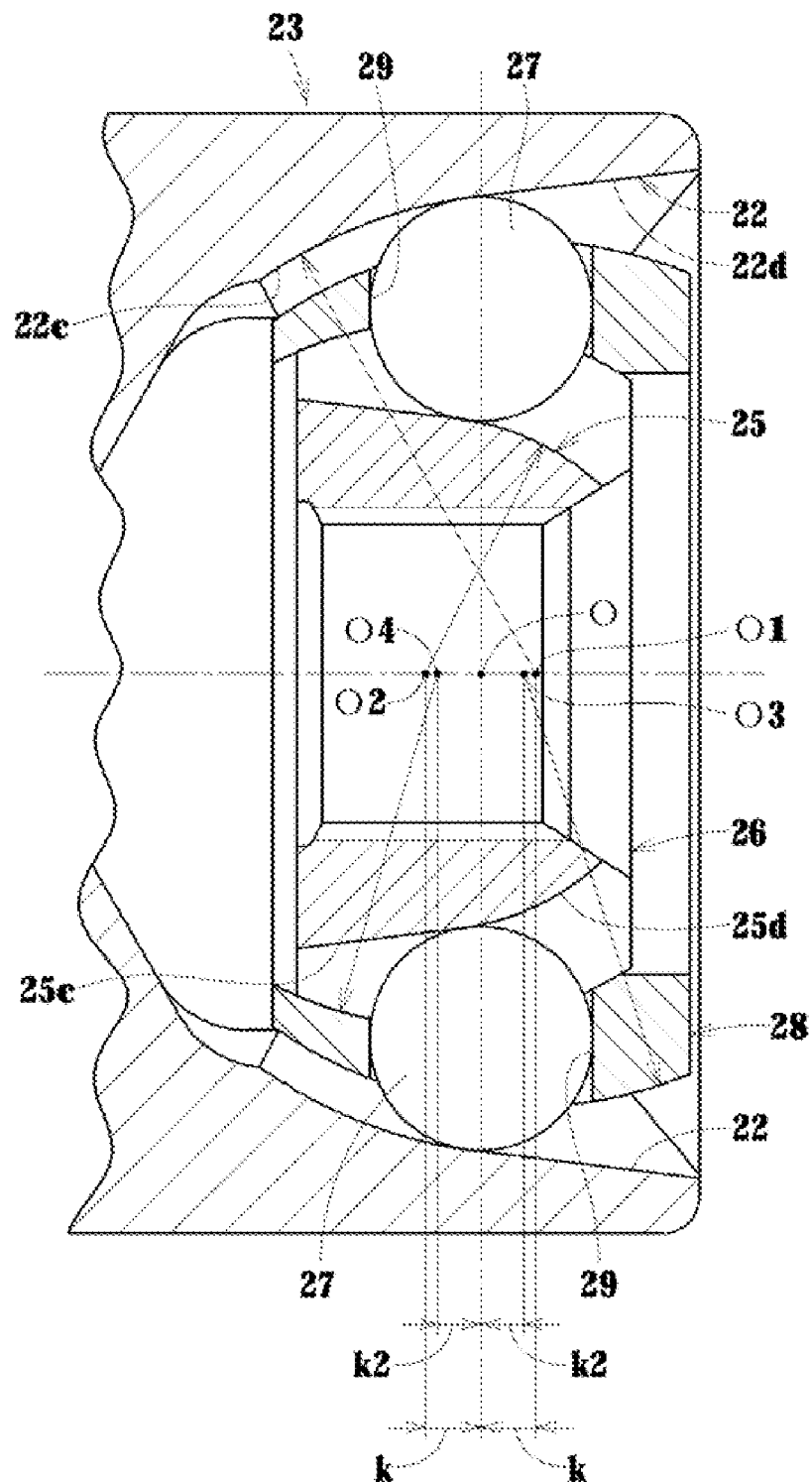
FIG. 23 A longitudinal cross-sectional view showing the fixed type constant velocity universal joint according to another embodiment of the present invention.

Then, FIG. 23 shows another embodiment, and in this case, the track groove bottoms of the inner ring 26 and the outer ring 23 include the circular arc portion and a tapered portion. That is, the track grooves include a back side track groove 22c in which the track groove bottom is the circular arc portion, and an opening side track groove 22d in which the track groove bottom is sloped to the outer diameter side from the back side toward the opening side. The back side track groove 22c displaces the center curvature O1 from the joint center O to the opening side of the outer ring 23 in the axial direction. Also, each of the track grooves 25 of the inner ring 26 includes a back side track groove 25c in which the track groove bottom is sloped to the outer diameter side from the opening side toward the back side, and an opening side track groove 25d in which the track groove bottom is the circular arc portion. The center curvatures O2 of the opening side track grooves 25b are apart from the joint center O toward the back sides opposite to the center curvatures O1 of the back side track grooves 22a of the outer ring 23 in the axial direction at regular distances k.

Similarly, in this case, the center curvature O3 of the outer spherical surface 28a of the cage 28 and the center curvature O4 of the inner spherical surface 28b of the cage 28 are offset with respect to the joint center O at regular distances in opposite axial directions, and the offset amount k of the cage 28 is substantially identical with the offset amounts k2 of the track grooves 22 and 25.

Other configurations of the fixed type constant velocity universal joint shown in FIG. 23 are identical with those of the fixed type constant velocity universal joint shown in FIG. 1, and the same members are denoted by identical symbols, and description thereof will be omitted.

For that reason, similarly, the fixed type constant velocity universal joint shown in FIG. 23 has the same effects as those of the fixed type constant velocity universal joint shown in FIG. 1. In FIG. 1, there is applied the undercut free type in which the track groove bottoms of the inner ring 26 and the outer ring 23 include the circular arc portion and the straight portion, thereby making it possible to heighten the joint operating angle. In contrast, when the track groove bottom includes the circular arc portion and the tapered portion as in the fixed type constant velocity universal joint shown in FIG. 23, the still higher angle can be obtained.

Figure 24:
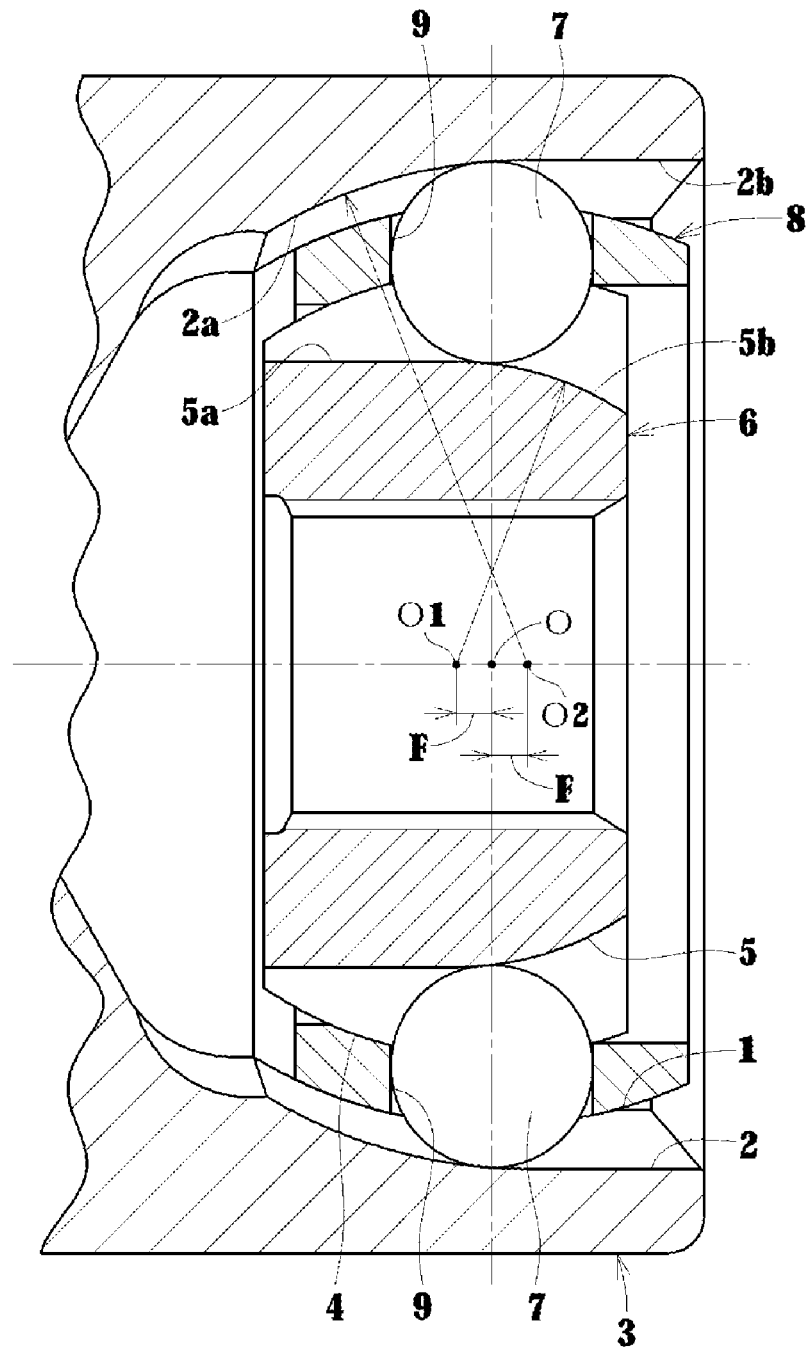
FIG. 24 A longitudinal cross-sectional view showing a conventional fixed type constant velocity universal joint.
Figure 25:
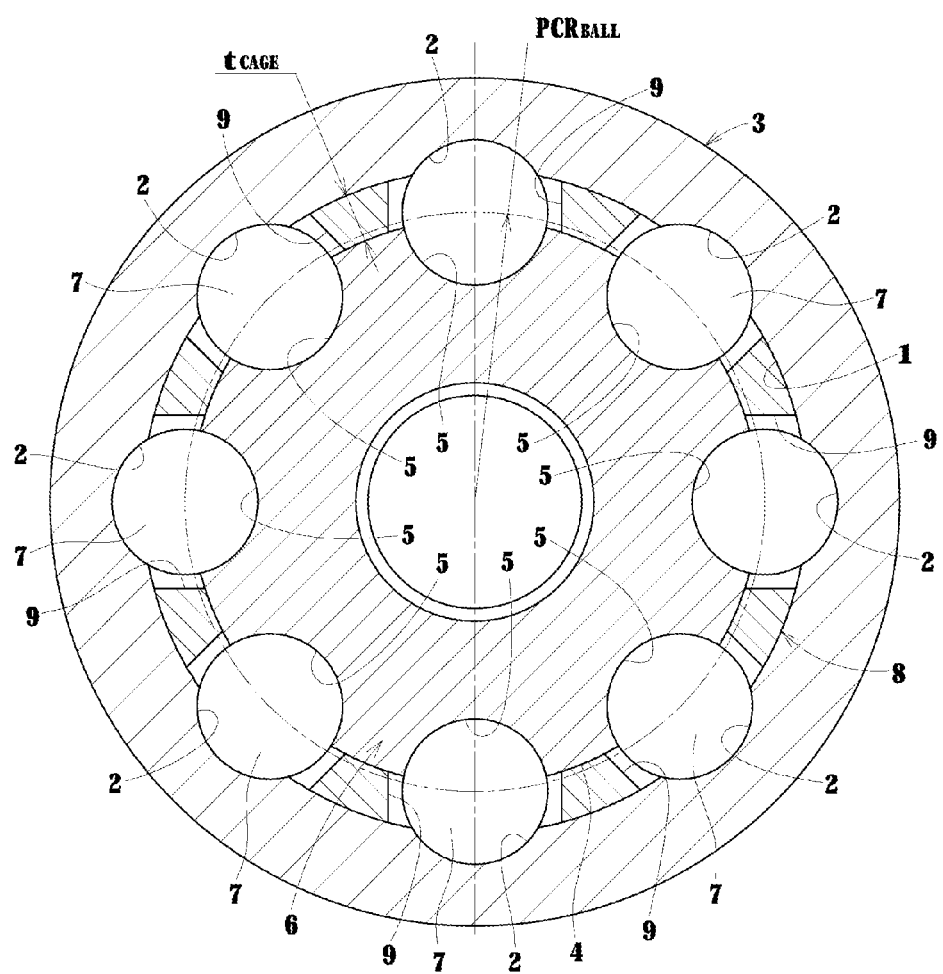
FIG. 25 A lateral cross-sectional view showing the conventional fixed type constant velocity universal joint.

The embodiments of the present invention have been described above. However, the present invention can be variously modified without being limited to the above embodiments. For example, in the above embodiments, the center curvature O1 and the center curvature O3 are slightly displaced, and the center curvature O2 and the center curvature O4 are slightly displaced. Alternatively, the center curvature O1 and the center curvature O3 can be at the same position, or the center curvature O2 and the center curvature can be at the same position. Also, when the center curvature O1 and the center curvature O3 are displaced, or the center curvature O2 and the center curvature O4 are displaced, the amount of displacement can be arbitrarily set. However, it is preferable that the ratio of the offset amount k and the displacement amount (k−k2) be set to (k−k2)/k≦0.3. When (k−k2)/k>0.3 is satisfied, there is no difference from the conventional fixed type constant velocity universal joint shown in FIG. 24, the track groove depth of the joint back side is made shallow, and the thickness of the cage 28 at the opening side cannot be increased, which is lower than the required strength of the joint.

Also, the circumferential interval h of the long pocket 30 can be variously set within a range in which the property of incorporating the cage 28 into the inner ring 26 is improved, and the rigidity of the pillar portion 33 is not deteriorated. Further, the shoulder width dimension f between the track grooves, and the pocket width g of the cage 28 in the cage axial direction can be set taking the property of incorporating the cage 28 into the outer ring 23 in consideration. The projection end surface 36a of the expansion portion 36 may not be a flat surface, but can be a curved surface.

In the fixed type constant velocity universal joint shown in FIG. 23, the long pockets 30 shown in FIGS. 9 to 12 can be disposed in the cage 28. Also, the inner rings 26 having the notch portion 45 shown in FIGS. 13 and 17 can be used as the inner ring 26.

As shown in FIG. 5 and the like, when the track grooves 25 of the inner ring 26 and the track grooves 22 of the outer ring 23 are arranged at irregular pitches in the circumferential direction, those track grooves are arranged at irregular pitches in the circumferential direction of the ball 27. For that reason, in the above embodiments, two balls that are arranged at an angle lower than 60° are received in one long pocket 30. That is, the pillar portion between two balls which are disposed at the angle lower than 60° is omitted. Alternatively, the pillar portion may not be omitted, and in this case, six pillar portions are formed as shown in FIG. 1, whereby the strength of the entire cage is improved, and the rigidity becomes large.

INDUSTRIAL APPLICABILITY

In the fixed type constant velocity universal joint according to the present invention, there can be applied the undercut free type constant velocity universal joint (UJ) having the circular arc portion and the straight portion of the track groove bottoms, or the bar field type constant velocity universal joint (BJ) in which only the circular arc portion is formed in the track groove bottoms.

The invention claimed is:

1. A fixed type constant velocity universal joint, comprising:
   an outer joint member in which six track grooves that extend in an axial direction of the outer joint member are formed on an inner spherical surface of the outer joint member;
   an inner joint member in which six track grooves that extend in an axial direction of the inner joint member are formed on an outer spherical surface of the inner joint member;
   six torque transmission balls which are arranged in a plurality of ball tracks, each of the ball tracks being formed by one of the track grooves of the outer joint member and one of the track grooves of the inner joint member; and
   a cage that is interposed between the inner spherical surface of the outer joint member and the outer spherical surface of the inner joint member to hold the torque transmission balls,
   wherein a center curvature of an outer spherical surface of the cage is offset to a joint opening side with respect to a joint center of the fixed type constant velocity universal joint, and a center curvature of an inner spherical surface of the cage is offset to a joint back side with respect to the joint center, the center curvature of the outer spherical surface and the center curvature of the inner spherical surface being at regular distances from the joint center in opposite directions along a central axis of the fixed type constant velocity universal joint, respectively,
   wherein the track grooves of the inner joint member are arranged at irregular pitches in a circumferential direction of the inner joint member, and a circumferential length of sections of an opening side end of the inner spherical surface of the outer joint member, which are disposed within a minimum pitch among a plurality of sections of the inner spherical surface of the outer joint member that are arranged between adjacent pairs of the track grooves of the outer joint member, is set to be smaller than a width of a pocket of the cage,
   wherein a phase of two pitches which are symmetrically positioned with respect to the joint center among pitches between adjacent pairs of the track grooves of the inner joint member is set to be smaller than 60°, a phase of a remaining four pitches is set to be larger than 60°, and the circumferential length of the sections of the opening side end of the inner spherical surface of the outer joint member, which are disposed within the pitches of the phase that are smaller than 60°, is set to be smaller than the width of the pocket of the cage, wherein at least a part of a pillar portion of the cage, which is disposed within the pitches of the phase that are smaller than 60°, is removed to form long pockets that each hold two of the torque transmission balls, and a circumferential length of the long pockets is set to be larger than a width of the inner joint member, and wherein an offset angle $\theta_{CAGE}$ of the cage, which is defined by a line that connects the center curvature of the inner spherical surface of the cage or the center curvature of the outer spherical surface of the cage and a center of one of the torque transmission balls along a plane that passes through and is parallel to the central axis, and a line that connects the center of the one of the torque transmission balls and the joint center along the plane in a state where a joint operating angle is 0°, is set in a range of $2.7° \leq \theta_{CAGE} \leq 5.7°$.

2. A fixed type constant velocity universal joint according to claim 1,
wherein center curvatures of the track grooves of the outer joint member are offset to the joint opening side with respect to the joint center, and center curvatures of the track grooves of the inner joint member are offset to the joint back side with respect to the joint center, the center curvatures of the track grooves of the outer joint member and the center curvatures of the track grooves of the inner joint member being at other regular distances from the joint center in opposite directions along the central axis, respectively, and wherein an offset angle $\theta_{TRACK}$ of the track grooves of the outer and inner joint members, which is defined by a line that connects the center curvatures of the track grooves of the inner joint member or the outer joint member and a center of one of the torque transmission balls along the plane, and a line that connects the center of the one of the torque transmission balls and the joint center along the plane, is set to be substantially identical with the offset angle $\theta_{CAGE}$ of the cage.

3. A fixed type constant velocity universal joint according to claim 1,
wherein a ratio r1 ($= PCD_{BALL}/D_{BALL}$) of a pitch circle diameter ($PCD_{BALL}$) of the torque transmission balls and a diameter ($D_{BALL}$) of the torque transmission balls is set in a range of $3.0 \leq r1 \leq 3.3$.

4. A fixed type constant velocity universal joint according to claim 1,
wherein a ratio r2 ($= D_{OUTER}/D_{BALL}$) of an outer diameter ($D_{OUTER}$) of the outer joint member and a diameter ($D_{BALL}$) of the torque transmission balls is set in a range of $4.6 \leq r2 \leq 4.8$.

5. A fixed type constant velocity universal joint according to claim 1,
wherein the at least the part of the pillar portion of the cage, which is disposed within the pitches of the phase that are smaller than 60°, is removed by press working.

6. A fixed type constant velocity universal joint according to claim 1,
wherein the at least the part of the pillar portion of the cage, which is disposed within the pitches of the phase that are smaller than 60°, is removed by a milling process.

7. A fixed type constant velocity universal joint according to claim 1,
wherein a terminal edge of at least one of the track grooves of the inner joint member towards the joint back side has a notch portion formed therein.

8. A fixed type constant velocity universal joint according to claim 7,
wherein the notch portion is formed by plastic forming.

9. A fixed type constant velocity universal joint according to claim 1,
wherein the fixed type constant velocity universal joint is of an undercut free type and each of bottom surfaces of the track grooves of the inner joint member and the outer joint member has a straight portion.

10. A fixed type constant velocity universal joint according to claim 1,
wherein each of bottom surfaces of the track grooves of the inner joint member and the outer joint member has a tapered portion.

11. A fixed type constant velocity universal joint according to claim 1,
wherein at least one of the track grooves of the outer joint member and the track grooves of the inner joint member are formed by plastic forming.

12. A fixed type constant velocity universal joint according to claim 1,
wherein at least one of the track grooves of the outer joint member and the track grooves of the inner joint member are formed by a grinding process or a quenching steel cutting process.

13. A fixed type constant velocity universal joint, comprising:
an outer joint member in which six track grooves that extend in an axial direction of the outer joint member are formed on an inner spherical surface of the outer joint member;
an inner joint member in which six track grooves that extend in an axial direction of the inner joint member are formed on an outer spherical surface of the inner joint member;
six torque transmission balls which are arranged in a plurality of ball tracks, each of the ball tracks being formed by one of the track grooves of the outer joint member and one of the track grooves of the inner joint member; and
a cage that is interposed between the inner spherical surface of the outer joint member and the outer spherical surface of the inner joint member to hold the torque transmission balls,
wherein a cage thickness at a pocket center position of the cage is $t_{CAGE}$, a pitch circle radius of the torque transmission balls when an operating angle is 0° is $PCR_{BALL}$, and $t_{CAGE}/PCR_{BALL}$ which is a ratio of the cage thickness and the pitch circle radius is equal to or higher than 0.20 and equal to or lower than 0.23, and
wherein a ratio r1 ($= PCD_{BALL}/D_{BALL}$) of a pitch circle diameter ($PCD_{BALL}$) of the torque transmission balls and a diameter ($D_{BALL}$) of the torque transmission balls is set in a range of $3.0 < r1 < 3.3$.

14. A fixed type constant velocity universal joint according to claim 13,
wherein an offset angle $\theta_{CAGE}$ of the cage, which is defined by lines that connect a center curvature of an inner spherical surface of the cage or a center curvature of an outer spherical surface of the cage and a center of one of the torque transmission balls along a plane that passes through and is parallel to a central axis of the fixed type constant velocity universal joint, and a line that connects the center of the one of the torque transmission balls and a joint center of the fixed type constant velocity universal joint along the plane in a state where a joint operating angle is 0°, is set in a range of $2.7° \leqq \theta_{CAGE} \leqq 5.7°$.

15. A fixed type constant velocity universal joint according to claim 13,
wherein center curvatures of the track grooves of the outer joint member are offset to a joint opening side with respect to a joint center of the fixed type constant velocity universal joint, and center curvatures of the track grooves of the inner joint member are offset to a joint back side with respect to the joint center, the center curvatures of the track grooves of the outer joint member and the center curvatures of the track grooves of the inner joint member being at regular distances from the joint center in opposite directions along a central axis of the fixed type constant velocity universal joint, respectively, and
wherein an offset angle $\theta_{TRACK}$ of the track grooves of the outer and inner joint members, which is defined by a line that connects the center curvatures of the track grooves of the inner joint member or the outer joint member and a center of one of the torque transmission balls along a plane that passes through and is parallel to the central axis, and a line that connects the center of the one of the torque transmission balls and the joint center along the plane, is set to be substantially identical with an offset angle $\theta_{CAGE}$ of the cage.

16. A fixed type constant velocity universal joint according to claim 13,
wherein a ratio r2 ($=D_{OUTER}/D_{BALL}$) of an outer diameter ($D_{OUTER}$) of the outer joint member and the diameter ($D_{BALL}$) of the torque transmission balls is set in a range of $4.6 \leqq r2 \leqq 4.8$.

17. A fixed type constant velocity universal joint according to claim 13,
wherein the track grooves of the inner joint member and the outer joint member are arranged at irregular pitches in a circumferential direction of the inner joint member and the outer joint member, respectively, and a circumferential length of sections of an opening side end of the inner spherical surface of the outer joint member, which are disposed within a minimum pitch among a plurality of sections of the inner spherical surface of the outer joint member that are arranged between adjacent pairs of the track grooves of the outer joint member, is set to be smaller than a width of a pocket of the cage.

18. A fixed type constant velocity universal joint according to claim 13,
wherein a terminal edge of at least one of the track grooves of the inner joint member towards a joint back side has a notch portion formed therein.

19. A fixed type constant velocity niversal joint according to claim 13,
wherein the fixed type constant velocity universal joint is of an undercut free type and each of bottom surfaces of the track grooves of the inner joint member and the outer joint member has a straight portion.

20. A fixed type constant velocity universal joint according to claim 13,
wherein each of bottjm surfaces of the track grooves of the inner joint member and the outer joint member has a tapered portion.

21. A fixed type constant velocity universal joint according to claim 13,
wherein at least one of the track grooves of the outer joint member and the track grooves of the inner joint member are formed by plastic forming.

22. A fixed type constant velocity universal joint according to claim 13,
wherein at least one of the track grooves of the outer joint member and the track grooves of the inner joint member are formed by a grinding process or a quenching steel cutting process.

* * * * *